US012412977B2

(12) United States Patent
Kowaita et al.

(10) Patent No.: US 12,412,977 B2
(45) Date of Patent: Sep. 9, 2025

(54) VEHICULAR ANTENNA DEVICE

(71) Applicant: YOKOWO CO., LTD., Tokyo (JP)

(72) Inventors: Kazuhiro Kowaita, Tomioka (JP); Hiroto Ieda, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 627 days.

(21) Appl. No.: 17/794,624

(22) PCT Filed: Jan. 7, 2021

(86) PCT No.: PCT/JP2021/000303
§ 371 (c)(1),
(2) Date: Jul. 22, 2022

(87) PCT Pub. No.: WO2021/153179
PCT Pub. Date: Aug. 5, 2021

(65) Prior Publication Data

US 2023/0066694 A1 Mar. 2, 2023

(30) Foreign Application Priority Data

Jan. 28, 2020 (JP) ................................ 2020-011871

(51) Int. Cl.
*H01Q 1/32* (2006.01)
*H01Q 5/307* (2015.01)
(Continued)

(52) U.S. Cl.
CPC ........... *H01Q 1/3275* (2013.01); *H01Q 5/307* (2015.01); *H01Q 9/28* (2013.01); *H01Q 21/24* (2013.01); *H01Q 21/26* (2013.01)

(58) Field of Classification Search
CPC .......... H01Q 21/26; H01Q 1/32; H01Q 1/325; H01Q 1/3275
See application file for complete search history.

(56) References Cited

U.S. PATENT DOCUMENTS 6,211,840 B1 * 4/2001 Wood .................... H01Q 9/065 343/793
6,342,867 B1 * 1/2002 Bell .................... H01Q 19/108 343/797
(Continued)

FOREIGN PATENT DOCUMENTS

CN 206585077 U * 10/2017
CN 108321517 A * 7/2018 ............... H01Q 1/38
(Continued)

OTHER PUBLICATIONS

Extended European search report issued on Jan. 31, 2024, in corresponding European patent Application No. 21748197.7, 10 pages.

(Continued)

*Primary Examiner* — A B Salam Aklassim, Jr.
(74) *Attorney, Agent, or Firm* — XSENSUS LLP

(57) ABSTRACT

An antenna element (200) includes a first element (210) having a first feed portion, and a first element section (210*a*) and a second element section (210*b*) at opposite sides of the first feed portion, and a second element (220) having a second feed portion and, a third element section (220*a*) and a fourth element section (220*b*) at opposite sides of the second feed portion, at least a part of the first element (210) and at least a part of the second element (220) face each other, and one of the first element section (210*a*) and the second element section (210*b*) is arranged at an angle with respect to the other of the first element section (210*a*) and the second element section (210*b*).

13 Claims, 17 Drawing Sheets

(51) Int. Cl.

| | |
|---|---|
| ***H01Q 9/28*** | (2006.01) |
| ***H01Q 21/24*** | (2006.01) |
| ***H01Q 21/26*** | (2006.01) |

(56) References Cited

U.S. PATENT DOCUMENTS

| | | | | |
|---|---|---|---|---|
| 7,277,056 | B1 | 10/2007 | Thiam et al. | |
| 7,528,780 | B2 | 5/2009 | Thiam et al. | |
| 8,994,603 | B2 | 3/2015 | Harel et al. | |
| 9,190,734 | B2 | 11/2015 | Niver et al. | |
| 9,831,545 | B2 * | 11/2017 | Sugimoto | H01Q 21/28 |
| 11,616,292 | B2 * | 3/2023 | Hara | H01Q 9/40 343/702 |
| 11,699,856 | B1 * | 7/2023 | Hill | H01Q 9/42 343/702 |
| 2005/0195124 | A1 * | 9/2005 | Puente Baliarda | H01Q 9/0414 343/893 |
| 2007/0241983 | A1 * | 10/2007 | Cao | H01Q 21/26 343/797 |
| 2010/0117914 | A1 * | 5/2010 | Feller | H01Q 21/26 343/820 |
| 2010/0265147 | A1 * | 10/2010 | Wakui | H01Q 1/36 343/725 |
| 2012/0133567 | A1 * | 5/2012 | Harel | H01Q 9/28 343/798 |
| 2013/0307743 | A1 * | 11/2013 | Moon | H01Q 21/08 343/833 |
| 2014/0232606 | A1 * | 8/2014 | Niver | H01Q 9/285 343/807 |
| 2015/0084823 | A1 * | 3/2015 | Wang | H01Q 25/001 343/797 |
| 2017/0077596 | A1 * | 3/2017 | Martínez Ortigosa | H01Q 1/42 |
| 2017/0170552 | A1 * | 6/2017 | Baek | H01Q 1/36 |
| 2019/0280372 | A1 * | 9/2019 | Terashita | H01Q 1/22 |
| 2020/0006850 | A1 * | 1/2020 | Filatov | H01Q 1/48 |
| 2020/0028249 | A1 * | 1/2020 | Terashita | H01Q 1/521 |
| 2021/0050647 | A1 * | 2/2021 | Takano | H01Q 9/36 |
| 2021/0234284 | A1 * | 7/2021 | Sampo | H01Q 5/342 |
| 2021/0242584 | A1 * | 8/2021 | Terashita | H01Q 1/521 |
| 2021/0273320 | A1 * | 9/2021 | Yokota | H01Q 9/36 |
| 2021/0376457 | A1 * | 12/2021 | Sone | H01Q 21/08 |
| 2022/0200159 | A1 * | 6/2022 | Abdelrahman | H01Q 9/285 |
| 2023/0077546 | A1 * | 3/2023 | Ono | H01Q 1/42 343/749 |
| 2023/0155293 | A1 * | 5/2023 | Sone | H01Q 1/48 343/848 |
| 2023/0253712 | A1 * | 8/2023 | Hara | H01Q 21/28 343/713 |
| 2023/0335890 | A1 * | 10/2023 | Yokota | H01Q 1/32 |
| 2024/0047880 | A1 * | 2/2024 | Ieda | H01Q 1/3275 |
| 2024/0097317 | A1 * | 3/2024 | Terashita | H01Q 21/28 |
| 2024/0305017 | A1 * | 9/2024 | Ng | H01Q 1/521 |
| 2024/0380100 | A1 * | 11/2024 | Zheng | H01Q 5/42 |
| 2024/0421469 | A1 * | 12/2024 | Sato | H01Q 5/335 |
| 2025/0070471 | A1 * | 2/2025 | Ieda | H01Q 1/38 |
| 2025/0087900 | A1 * | 3/2025 | Iwasaki | H01Q 1/22 |

FOREIGN PATENT DOCUMENTS

| | | | |
|---|---|---|---|
| GB | 2316233 | A | 2/1998 |
| JP | 57-65010 | A | 4/1982 |
| JP | 2014-79008 | A | 5/2014 |
| JP | 2014-527360 | A | 10/2014 |
| JP | 2018-182362 | A | 11/2018 |
| JP | 2019-41240 | A | 3/2019 |
| KR | 20100097923 | A * | 9/2010 |

OTHER PUBLICATIONS

International Search Report and Written Opinion mailed on Apr. 13, 2021, received for PCT Application PCT/JP2021/000303, filed on Jan. 7, 2021, 8 pages including English Translation.

* cited by examiner

VEHICULAR ANTENNA DEVICE

CROSS-REFERENCE TO RELATED APPLICATIONS

The present application is based on PCT filing PCT/JP2021/000303, filed Jan. 7, 2021, which claims priority to JP 2020-011871, filed Jan. 28, 2020, the entire contents of each are incorporated herein by reference.

TECHNICAL FIELD

The present invention relates to a vehicular antenna device.

BACKGROUND ART

In recent years, antenna devices used for Global Navigation Satellite System (GNSS) such as a Global Positioning System (GPS) have been developed. Particularly in recent years, for applications such as Advanced Driver-Assistance Systems (ADAS) that acquire high-precision position information in a short time, there is a demand for GNSS antennas that support a wide range of bands within a multi-band including L1 band (1559 MHz to 1610 MHZ), L band (1525 MHz to 1559 MHZ), L5 band (1164 MHz to 1214 MHZ), L2 band (1212 MHZ to 1254 MHZ), and L6 band (1273 MHz to 1284 MHZ).

Patent Documents 1 and 2 describe a stacked patch antenna. This antenna includes a first patch antenna and a second patch antenna. The first patch antenna is stacked on the second patch antenna. The center frequency of the first patch antenna is adjusted to a frequency (for example, 2.320 GHz to 2.345 GHZ) used in Satellite Digital Audio Radio Service (SDARS). The center frequency of the second patch antenna is adjusted to a frequency (for example, 1.575 GHZ) used in GPS.

Patent Document 3 describes a GPS patch antenna. This antenna includes a dielectric plate, a first antenna disposed on the dielectric plate and compatible with the L1 band, and a second antenna disposed on the dielectric plate and compatible with the L2 band. The size of the dielectric plate is a square plate having a length of 40 mm, a width of 40 mm, and a height of 4 mm. The relative permittivity of the dielectric plate is 6.8. The first antenna and the second antenna are formed in a loop shape. The first antenna is located inside the loop of the second antenna. Patent Document 3 describes that according to this antenna, a high gain of 0 dBic or more and a low axial ratio of 5 dB or less are obtained in the L1 band and the L2 band.

Patent Document 4 describes a multi-band GNSS patch antenna. This antenna includes a dielectric plate, a first conductive plate disposed on one surface side of the dielectric plate, and a second conductive plate disposed on the opposite surface side of one surface of the dielectric plate. A notch is formed on the outer periphery of the second conductive plate. Patent Document 4 describes that the antenna can be compatible with 1.15 GHZ, 1.56 GHZ, 1.17645 GHZ and 1.57542 GHz by adjusting various conditions such as the shape of the notch of the second conductive plate.

RELATED DOCUMENT

Patent Document

[Patent Document 1] U.S. Pat. No. 7,277,056
[Patent Document 2] U.S. Pat. No. 7,528,780

[Patent Document 3] Japanese Unexamined Patent Publication No. 2018-182362
[Patent Document 4] Japanese Unexamined Patent Publication No. 2019-041240

SUMMARY OF THE INVENTION

Technical Problem

As described above, various applications such as ADAS require a GNSS antenna compatible with a wide range of bands within a multi-band including L1 band, L band, L5 band, L2 band, and L6 band. In addition, it is desirable that such a GNSS antenna be miniaturized due to various demands such as accommodation space. When the patch antennas described in Patent Documents 1 to 4 support a wide band, however, it may be necessary to increase the size of the patch antenna and difficult to miniaturize the patch antenna. According to the patch antenna described in Patent Document 3, for example, the antenna is optimized with the L1 band and the L2 band as resonance frequencies. Accordingly, high gain and low axial ratio are obtained in the L1 band and the L2 band. In bands other than the L1 band and the L2 band, on the other hand, a high gain such as 0 dBic or more and a low axial ratio such as 5 dB or less are not obtained. Further, in this patch antenna, the antenna is miniaturized optimizing the antenna with the L1 band and the L2 band being resonance frequencies, and the compatible band range of the antenna is narrowed.

An example of an object of the present invention is to miniaturize a GNSS antenna compatible with a wide range of bands within a multi-band including the L1 band, the L band, the L5 band, the L2 band and the L6 band. Other objects of the present invention will become apparent from the description herein.

Solution to Problem

According to one aspect of the present invention, there is provided a vehicular antenna device including:

an antenna element operable in at least two or more of frequency bands including L1 band, L band, L5 band, L2 band, and L6 band and receiving circular polarization, in which the antenna element includes a first element having a first feed portion, and a first element section and a second element section arranged at opposite sides of the first feed portion, and a second element having a second feed portion, and a third element section and a fourth element section arranged at opposite sides of the second feed portion, at least a part of the first element and at least a part of the second element face each other, and one of the first element section and the second element section is arranged at an angle with respect to the other of the first element section and the second element section.

Advantageous Effects of Invention

According to the above aspect of the present invention, a GNSS antenna compatible with a wide range of bands within a multi-band including L1 band, L band, L5 band, L2 band, and L6 band can be miniaturized.

DESCRIPTION OF EMBODIMENTS

Figure 1:
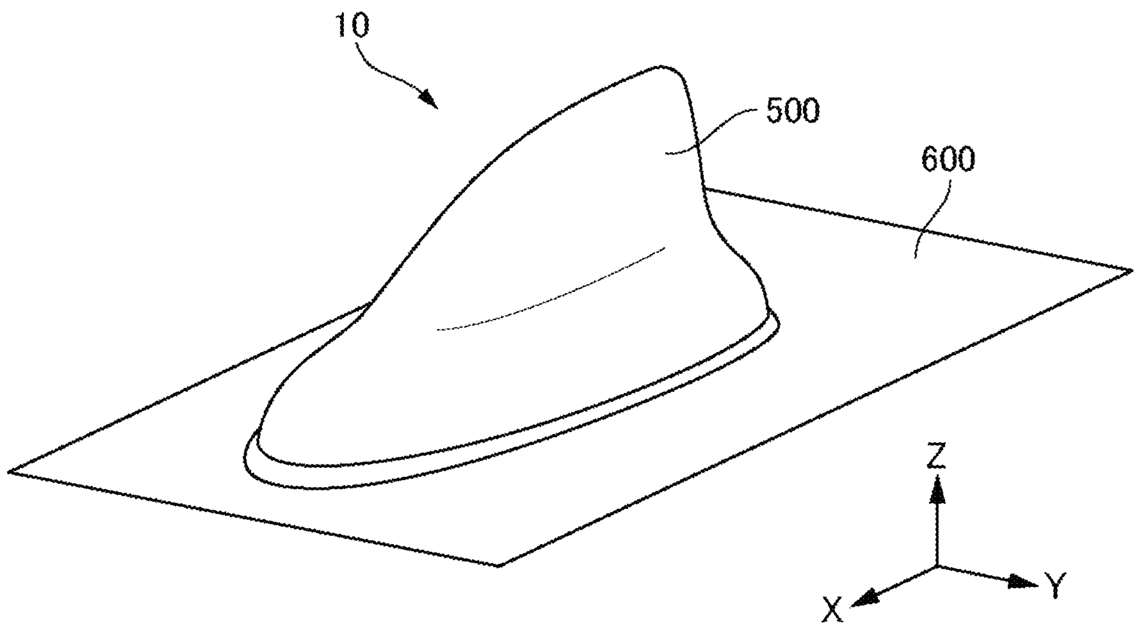
FIG. 1 is a perspective view of a vehicular antenna device according to an embodiment.

Hereinafter, embodiments of the present invention will be described with reference to the drawings. In all drawings, similar components are designated by the same reference numerals, and description thereof will not be repeated as appropriate.

In the present specification, the ordinal numbers such as "first", "second", and "third" are added only to distinguish the components having the same names unless otherwise specified, and does not mean a particular feature (for example, order or importance) of the component.

Figure 2:
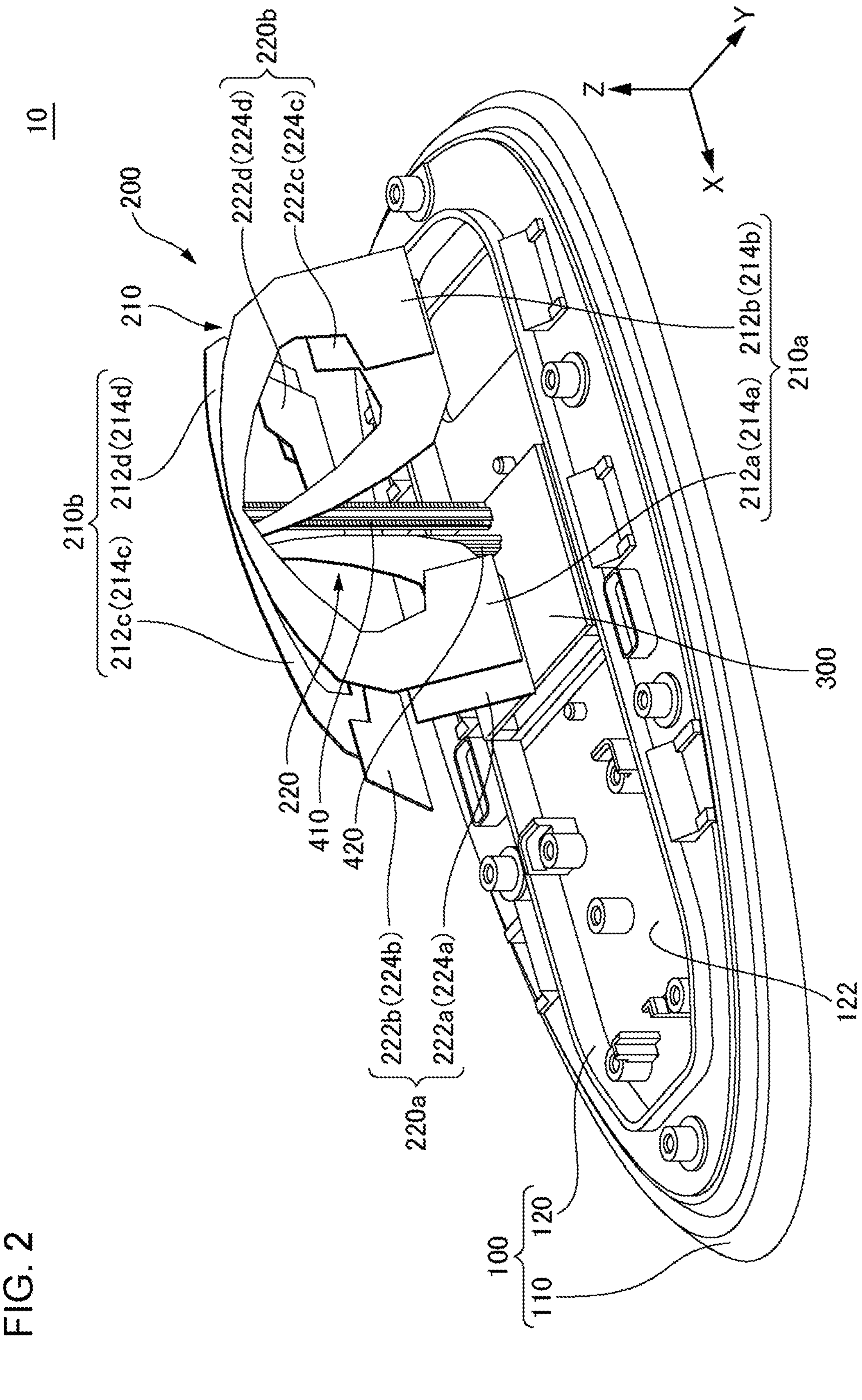
FIG. 2 is a diagram with a cover and a ground plate removed from FIG. 1.

FIG. 1 is a perspective view of a vehicular antenna device 10 according to the embodiment. FIG. 2 is a diagram with a cover 500 and a ground plate 600 removed from FIG. 1.

In FIGS. 1 and 2, a first direction X is the front-rear direction of the vehicular antenna device 10. The positive direction (the direction indicated by the arrow indicating the first direction X) of the first direction X is the front direction of the vehicular antenna device 10. The negative direction (the direction opposite to the direction indicated by the arrow indicating the first direction X) of the first direction X is the rear direction of the vehicular antenna device 10. The second direction Y is the left-right direction of the vehicular antenna device 10. The second direction Y intersects the first direction X, and is specifically orthogonal to the first direction X. The positive direction (the direction indicated by the arrow indicating the second direction Y) of the second direction Y is the left direction of the vehicular antenna device 10 as viewed from the rear (the negative direction of the first direction X) of the vehicular antenna device 10. The negative direction (the direction opposite to the direction indicated by the arrow indicating the second direction Y) of the second direction Y is the right direction of the vehicular antenna device 10 as viewed from the rear (the negative direction of the first direction X) of the vehicular antenna device 10. A third direction Z is the vertical direction of the vehicular antenna device 10. The third direction Z intersects both the first direction X and the second direction Y, and is specifically orthogonal to both the first direction X and the second direction Y. The positive direction (the direction indicated by the arrow indicating the third direction Z) of the third direction Z is the upward direction of the vehicular antenna device 10. The negative direction (the direction opposite to the direction indicated by the arrow indicating the third direction Z) of the third direction Z is the downward direction of the vehicular antenna device 10. The same applies to the following figures.

The outline of the vehicular antenna device 10 will be described with reference to FIGS. 1 and 2.

As shown in FIG. 2, the vehicular antenna device 10 includes a base 100, an antenna element 200, the circuit portion 300, a first feed line 410, and a second feed line 420. As shown in FIG. 1, the vehicular antenna device 10 further includes the cover 500.

In the example shown in FIG. 1, the vehicular antenna device 10 is disposed on the ground plate 600. In the present embodiment, the ground plate 600 is the roof of an automobile. That is, the vehicular antenna device 10 is attached to the upper surface side of the roof (ground plate 600) of the automobile. When the vehicular antenna device 10 is attached to the roof of an automobile, the positive direction of the first direction X is the forward direction of the automobile, and the negative direction of the first direction X is the backward direction of the automobile. As will be described in detail later, in a case where the vehicular antenna device 10 (antenna element 200) is disposed on the ground plate 600, the antenna element 200 can operate better as a GNSS antenna as compared with the case where the vehicular antenna device 10 (antenna element 200) is not disposed on the ground plate 600. However, the ground plate 600 to which the vehicular antenna device 10 is attached is not limited to the roof of the automobile.

The base 100 has a first base member 110 and a second base member 120. The first base member 110 and the second base member 120 have a thickness in the vertical direction (third direction Z) of the vehicular antenna device 10. The first base member 110 is made of an insulating material such as a resin. The second base member 120 is located on the first base member 110. The second base member 120 is made of a conductive material such as metal. The length of each of the first base member 110, the second base member 120, and the base 100 in the front-rear direction (first direction X) of the vehicular antenna device 10 is longer than the length of each of the first base member 110, the second base member 120, and the base 100 in the left-right direction (second direction Y) of the vehicular antenna device 10.

The base 100 may be composed of only the second base member 120, or may be composed of the second base member 120 and a metal plate. Further, the base 100 may be composed of the first base member 110 and a metal plate, or may be composed of the first base member 110, the second base member 120 and a metal plate.

The antenna element 200 is mounted on the mounting surface 122 of the base 100 (second base member 120) via the first feed line 410 and the second feed line 420. Details of the first feed line 410 and the second feed line 420 will be described later. The antenna element 200 is operable in a frequency band including L1 band (1559 MHz to 1610 MHZ), L band (1525 MHz to 1559 MHZ), L5 band (1164 MHZ to 1214 MHZ), L2 band (1212 MHz to 1254 MHZ), and L6 band (1273 MHZ to 1284 MHZ) and receives circular polarization. For example, the gain and axial ratio of the antenna element 200 in each of the L1 band, the L band, the L5 band, the L2 band, and the L6 band are 2.0 dBic or more and 4.0 dB or less, respectively. The antenna element 200 may not be operable in all of the L1 band, L band, L5 band, L2 band and L6 band, and may be operable in at least two or more of these bands.

The antenna element 200 has two elements, that is, a first element 210 and a second element 220.

The first element 210 has two element sections, that is, a first element section 210*a* and a second element section 210*b*. The second element 220 has two element sections, that is, a third element section 220*a* and a fourth element section 220*b*.

The first element section 210*a* includes two arms, that is, a first arm 212*a* and a second arm 212*b*. The second element section 210*b* includes two arms, that is, a third arm 212*c* and a fourth arm 212*d*. The third element section 220*a* includes two arms, that is, a fifth arm 222*a* and a sixth arm 222*b*. The fourth element section 220*b* includes two arms, that is, the seventh arm 222*c* and the eighth arm 222*d*.

As will be described in detail later, the first arm 212*a*, the second arm 212*b*, the third arm 212*c*, and the fourth arm 212*d* include a first portion 214*a*, a second portion 214*b*, a third portion 214*c*, and a fourth portion 214*d*, respectively. As will be described in detail later, the fifth arm 222*a*, the sixth arm 222*b*, the seventh arm 222*c*, and the eighth arm 222*d* include a fifth portion 224*a*, a sixth portion 224*b*, a seventh portion 224*c*, and an eighth portion 224*d*, respectively.

Each of the first element section 210*a* and the second element section 210*b* of the first element 210 and the third element section 220*a* and the fourth element section 220*b* of the second element 220 are made of a conductive plate, specifically, a sheet metal. The first element section 210*a* and the second element section 210*b* of the first element 210 each have a portion operating as a self-similar antenna or an equivalent antenna. The third element section 220*a* and the fourth element section 220*b* of the second element 220 each have a portion operating as a self-similar antenna or an equivalent antenna. The "self-similar antenna" is an antenna such as a biconical antenna or a bow tie antenna whose shape becomes similar even if the scale (size ratio) is changed. Details of the portion operating as a self-similar antenna or an equivalent antenna will be described later.

The circuit portion 300 is mounted on the mounting surface 122 of the base 100. The circuit portion 300 has, for example, an integrated circuit (IC). The circuit portion 300 is electrically connected to the first element 210 and the second element 220 via the first feed line 410 and the second feed line 420, respectively.

The lower end of the first feed line 410 (the end on the negative direction side of the third direction Z) and the lower end of the second feed line 420 (the end on the negative direction side of the third direction Z) are physically and electrically connected to the circuit portion 300 via solder, for example. The upper end of the first feed line 410 (the end on the positive direction side of the third direction Z) and the upper end of the second feed line 420 (the end on the positive direction side of the third direction Z) are physically and electrically connected to the first element 210 and the second element 220, for example, via solder, respectively. Each of the first feed line 410 and the second feed line 420 is, for example, a coaxial line. The first feed line 410 extends parallel to the height direction of the vehicular antenna device 10 between the lower end of the first feed line 410 and the upper end of the first feed line 410. The second feed line 420 extends parallel to the height direction of the vehicular antenna device 10 between the lower end of the second feed line 420 and the upper end of the second feed line 420.

In the present embodiment, the first feed line 410 and the second feed line 420 are supports for supporting the first element 210 and the second element 220 on the mounting surface 122 of the base 100. However, the method of supporting the first element 210 and the second element 220 on the mounting surface 122 of the base 100 is not limited to this example.

The length of each of the first feed line 410 and the second feed line 420 in the height direction of the vehicular antenna device 10 is approximately λ/4 (A: wavelength at the operating frequency of the antenna element 200). Approximately λ/4 means not only exact λ/4 but also a length slightly deviated from λ/4 (for example, a length within the range of +λ/10 from λ/4). The operating frequency of the antenna element 200 is, for example, the central frequency in each of the L1 band, the L band, the L5 band, the L2 band, and the L6 band. However, the operating frequency of the antenna element 200 may not be the central frequency in these bands, and may be a frequency deviating from the central frequency. The length of each of the first feed line 410 and the second feed line 420 in the height direction of the vehicular antenna device 10 is approximately λ/4. Further, in a case where the vehicular antenna device 10 is disposed on the ground plate 600, the antenna element 200 can operate better as a GNSS antenna as compared with the case where the vehicular antenna device 10 is not disposed on the ground plate 600. However, the vehicular antenna device 10 may not be disposed on the ground plate 600.

The cover 500 is attached to the upper surface side of the first base member 110 of the base 100, and covers the second base member 120 of the base 100, the antenna element 200, the circuit portion 300, the first feed line 410, and the second feed line 420. For attaching the cover 500 and the base 100, fixing means such as bolts may be adopted, or fixing means such as welding or adhesion may be adopted. As will be described in detail later, in the present embodiment, as compared with the case where the first element section 210*a* and the second element section 210*b* of the antenna element 200 are disposed in parallel with the mounting surface 122 of the base 100, the length of the antenna element 200 in the left-right direction of the vehicular antenna device 10 is shortened. Accordingly, the length of the cover 500 in the left-right direction of the vehicular antenna device 10 can be shortened as compared with the case where the first element section 210*a* and the second element section 210*b* are disposed in parallel with the mounting surface 122 of the base 100.

Next, the details of the shape of the first element 210 will be described with reference to FIG. 2.

The first element section 210*a* and the second element section 210*b* face each other in a predetermined direction, specifically, in the left-right direction of the vehicular antenna device 10. Specifically, the first element section 210*a* is located on the left side of the second element section 210*b*, and the second element section 210*b* is located on the right side of the first element section 210*a*. However, the facing direction of the first element section 210*a* and the second element section 210*b* is not limited to the left-right direction of the vehicular antenna device 10, and may be, for example, the front-rear direction of the vehicular antenna device 10. The first element 210 is located above the second element 220 in the height direction of the vehicular antenna device 10. However, the first element 210 may be located below the second element 220 in the height direction of the vehicular antenna device 10.

The first element 210 has a first feed portion that is a portion connected to the upper end of the first feed line 410. Each of the first element section 210*a* and the second element section 210*b* has a first base end portion where the first element section 210*a* and the second element section 210*b* are closest to each other and which includes the first feed portion. A first central portion, which is a substantially intermediate point between the first base end portion of the first element section 210*a* and the first base end portion of the second element section 210*b*, is the first feed portion of the first element 210. The "substantially intermediate point" means not only the exact intermediate point between the first base end portion of the first element section 210*a* and the first base end portion of the second element section 210*b*, but also a point deviated from the exact intermediate point by a slight distance (for example, 5% or less of the distance between the first base end portion of the first element section 210*a* and the first base end portion of the second element section 210*b*).

The first arm 212*a* and the second arm 212*b* of the first element section 210*a* are arranged in the front-rear direction of the vehicular antenna device 10. Specifically, the first arm 212*a* is located on the front side of the second arm 212*b*, and the second arm 212*b* is located on the rear side of the first arm 212*a*. The first arm 212*a* and the second arm 212*b* extend in a direction away from each other from the first base end portion of the first element section 210*a*. The third arm 212*c* and the fourth arm 212*d* of the second element section 210*b* are arranged in the front-rear direction of the vehicular antenna device 10. Specifically, the third arm 212*c* is located on the front side of the fourth arm 212*d*, and the fourth arm 212*d* is located on the rear side of the third arm 212*c*. The third arm 212*c* and the fourth arm 212*d* extend in a direction away from each other from the first base end portion of the second element section 210*b*. Further, the first arm 212*a* and the third arm 212*c* are arranged in the left-right direction of the vehicular antenna device 10. The second arm 212*b* and the fourth arm 212*d* are arranged in the left-right direction of the vehicular antenna device 10. The first element 210 is formed by joining the first element section 210*a* and the second element section 210*b* symmetrically about the first feed portion of the first element 210. Alternatively, the first element section 210*a* and the second element section 210*b* may be integrally formed.

The tips of the first arm 212*a* and the second arm 212*b* of the first element section 210*a* (opposite ends of the first base end portion) are spaced apart from each other and are open. That is, the tips of the first arm 212*a* and the second arm 212*b* of the first element section 210*a* each have an open end portion. Each open end portion of the first element section 210*a* is formed to mainly secure the area of the first element 210 above a certain level in order to secure a low frequency band, particularly to enable use in a lower frequency band. In the present embodiment, each open end portion of the first element section 210*a* has an L-shape. However, the shape of each open end portion of the first element section 210*a* is not limited to the L-shape, and may be, for example, a trapezoid, a rhombus, an ellipse, a circle, a triangle, or the like. A shape similar to the shape described above for the tip of each of the first arm 212*a* and the second arm 212*b* of the first element section 210*a* may be applied to the tip of each of the third arm 212*c* and the fourth arm 212*d* of the second element section 210*b*.

The width of each of the first arm 212*a*, the second arm 212*b*, the third arm 212*c*, and the fourth arm 212*d* increases from the first base end portion toward the tip of each of the first arm 212*a*, the second arm 212*b*, the third arm 212*c*, and the fourth arm 212*d*. Accordingly, the width of each of the first arm 212*a*, the second arm 212*b*, the third arm 212*c*, and the fourth arm 212*d* in the region far from the first base end portion is wider than the width of each of the first arm 212*a*, the second arm 212*b*, the third arm 212*c*, and the fourth arm 212*d* in the region close to the first base end portion. The distance between the first arm 212*a* and the third arm 212*c* increases continuously or stepwise from the first base end portion of the first element section 210*a* or the first base end portion of the second element section 210*b* toward the tip of the first arm 212*a* or the tip of the third arm 212*c*. Accordingly, the distance between the first arm 212*a* and the third arm 212*c* in the region far from the first base end portion of the first element section 210*a* or the first base end portion of the second element section 210*b* is wider than the distance between the first arm 212*a* and the third arm 212*c* in the region close to the first base end portion of the first element section 210*a* or the first base end portion of the second element section 210*b* 210*a*. Similarly, the distance between the second arm 212*b* and the fourth arm 212*d* increases continuously or stepwise from the first base end portion of the first element section 210*a* or the first base end portion of the second element section 210*b* toward the tip of the second arm 212*b* or the tip of the fourth arm 212*d*. Accordingly, the distance between the second arm 212*b* and the fourth arm 212*d* in the region far from the first base end portion of the first element section 210*a* or the first base end portion of the second element section 210*b* is wider than the distance between the second arm 212*b* and the fourth arm 212*d* in the region close to the first base end portion of the first element section 210*a* or the first base end portion of the second element section 210*b*. In this way, the first arm 212*a*, the second arm 212*b*, the third arm 212*c*, and the fourth arm 212*d* of the first element 210 operate as a self-similar antenna or an equivalent antenna.

In the present embodiment, the first element section 210*a* is formed in a substantially C-shape. The substantially C-shape is a shape formed by subtracting a portion from a substantially circular shape such as a circle or an ellipse. The first element section 210*a* has an opening formed between the first arm 212*a* and the second arm 212*b* by this substantially C-shape. The first element section 210*a* may be formed in a substantially U-shape, a substantially V-shape, or a substantially n-shape. The substantially U-shape is, for example, a shape formed by subtracting a portion from a substantially quadrangle and rounding the opposite side of the portion of the substantially quadrangle. The substantially V-shape is, for example, a shape formed by subtracting a portion from a substantially triangle or a portion from a substantially quadrangle such as a trapezoid whose upper side is relatively short with respect to the lower side. The substantially n-shape is, for example, a shape formed by subtracting a portion from a substantially quadrangle such as a rectangle, a square, or a trapezoid whose upper side is relatively long with respect to the lower side. The same applies to the shape of the second element section 210*b*. In the first element section 210*a* and the second element section 210*b*, the opening of the first element section 210*a* and the opening of the second element section 210*b* are disposed to face opposite to each other.

As will be described later with reference to FIG. 3, the first element section 210*a* and the second element section 210*b* are tilted by substantially the same angle from the direction (second direction Y) parallel to the mounting surface 122 of the base 100 toward the side (the negative direction side of the third direction Z) where the mounting surface 122 of the base 100 is located. In this way, one of the first element section 210*a* and the second element section 210*b* is arranged at an angle with respect to the other of the first element section 210*a* and the second element section 210*b*. Substantially the same angle means that the angle of inclination of the first element section 210*a* with respect to the direction parallel to the mounting surface 122 and the angle of inclination of the second element section 210*b* with respect to the direction parallel to the mounting surface 122 not only are exactly the same but also differ by a slight angle (for example, +5 degrees or less).

According to the present embodiment, the length of the first element 210 in the facing direction of the first element section 210*a* and the second element section 210*b* can be shortened, as compared to the case where one of the first element section 210*a* and the second element section 210*b* is not tilted with respect to the other of the first element section 210*a* and the second element section 210*b*, such as the case where the first element section 210*a* and the second element section 210*b* are disposed in parallel with the mounting surface 122 of the base 100. Accordingly, the vehicular antenna device 10 can be miniaturized. According to the present embodiment, the length of the first element 210 in the height direction of the vehicular antenna device 10 can be shortened, as compared with the case where the first element section 210*a* and the second element section 210*b* are tilted toward the opposite side (the positive direction side of the third direction Z) to the side where the mounting surface 122 is located. Further, according to the present embodiment, the radiation directivity of the antenna element 200 in the zenith direction (positive direction of the third direction Z) can be strengthened, as compared with the case where the angle of inclination of the first element section 210*a* with respect to the direction parallel to the mounting surface 122 is different from the angle of inclination of the second element section 210*b* with respect to the direction parallel to the mounting surface 122.

In the present embodiment, the first element section 210*a* is disposed on a plane inclined in the positive direction of the second direction Y with respect to the third direction Z. However, the first element section 210*a* may not be disposed on this plane. For example, the first element section 210*a* may be at least partially curved or bent when viewed from the positive or negative direction of the first direction X. The same applies to the second element section 210*b*.

Next, the details of the shape of the second element 220 will be described with reference to FIG. 2. In the present embodiment, the size connecting the outer edges of the second element 220 (hereinafter referred to as "outer edge size") is substantially equal to the outer edge size of the first element 210. That is, the first element 210 and the second element 220 have substantially the same shape. "The outer edge sizes are substantially equal" means that the outer edge size of the second element 220 is not only exactly equal to the outer edge size of the first element 210, but also, for example, 95% or more and 105% or less of the outer edge size of the first element 210. However, the outer edge size of the second element 220 may be different from the outer edge size of the first element 210.

The fifth portion 224*a*, the sixth portion 224*b*, the seventh portion 224*c*, and the eighth portion 224*d* are turned by about 90 degrees with respect to the third portion 214*c*, the fourth portion 214*d*, the first portion 214*a*, and the second portion 214*b*, respectively. "About 90 degrees" means that the turning angle of the first element 210 with respect to the second element 220 is not only exactly 90 degrees, but also deviates from 90 degrees by a slight angle (for example, +2.5 degrees or less).

The third element section 220*a* and the fourth element section 220*b* are arranged in the front-rear direction of the vehicular antenna device 10. Specifically, the third element section 220*a* is located on the front side of the fourth element section 220*b*, and the fourth element section 220*b* is located on the rear side of the third element section 220*a*.

The second element 220 has a second feed portion that is a part connected to the upper end of the second feed line 420. Each of the third element section 220*a* and the fourth element section 220*b* has a second base end portion in which the third element section 220*a* and the fourth element section 220*b* are closest to each other and which includes the second feed portion. A second central portion, which is a substantially intermediate point between the second base end portion of the third element section 220*a* and the second base end portion of the fourth element section 220*b*, is the second feed portion of the second element 220. The "substantially intermediate point" means not only the exact intermediate point between the second base end portion of the third element section 220*a* and the second base end portion of the fourth element section 220*b*, but also a point deviated from the exact intermediate point by a slight distance (for example, 5% or less of the distance between the second base end portion of the third element section 220*a* and the second base end portion of the fourth element section 220*b*).

The fifth arm 222*a* and the sixth arm 222*b* of the third element section 220*a* are arranged in the left-right direction of the vehicular antenna device 10. Specifically, the fifth arm 222*a* is located on the left side of the sixth arm 222*b*, and the sixth arm 222*b* is located on the right side of the fifth arm 222*a*. The fifth arm 222*a* and the sixth arm 222*b* extend in a direction away from each other from the second base end portion of the third element section 220*a*. The seventh arm 222*c* and the eighth arm 222*d* of the fourth element section 220*b* are arranged in the left-right direction of the vehicular antenna device 10. Specifically, the seventh arm 222*c* is located on the left side of the eighth arm 222*d*, and the eighth arm 222*d* is located on the right side of the seventh arm 222*c*. The seventh arm 222*c* and the eighth arm 222*d* extend in a direction away from each other from the second base end portion of the fourth element section 220*b*. Further, the fifth arm 222*a* and the seventh arm 222*c* are arranged in the front-rear direction of the vehicular antenna device 10. The sixth arm 222*b* and the eighth arm 222*d* are arranged in the front-rear direction of the vehicular antenna device 10. The second element 220 is formed by joining the third element section 220*a* and the fourth element section 220*b* symmetrically about the second feed portion of the second element 220. Alternatively, the third element section 220*a* and the fourth element section 220*b* may be integrally formed.

The tips of the fifth arm 222*a* and the sixth arm 222*b* of the third element section 220*a* (opposite ends of the second base end portion) are spaced apart from each other and are open. That is, the tips of the fifth arm 222*a* and the sixth arm 222*b* of the third element section 220*a* each have an open end portion. Each open end portion of the third element section 220*a* is formed to mainly secure the area of the second element 220 above a certain level in order to secure a low frequency band, particularly to enable use in a lower frequency band. In the present embodiment, each open end portion of the third element section 220*a* has an L-shape. However, the shape of each open end portion of the third element section 220*a* is not limited to the L-shape, and may be, for example, a trapezoid, a rhombus, an ellipse, a circle, a triangle, or the like. A shape similar to the shape described above for the tip of each of the fifth arm 222*a* and the sixth arm 222*b* of the third element section 220*a* may be applied to the tip of each of the seventh arm 222*c* and the eighth arm 222*d* of the fourth element section 220*b*.

The width of each of the fifth arm 222*a*, the sixth arm 222*b*, the seventh arm 222*c*, and the eighth arm 222*d* increases from the second base end portion toward the tip of each of the fifth arm 222*a*, the sixth arm 222*b*, the seventh arm 222*c*, and the eighth arm 222*d*. Accordingly, the width of each of the fifth arm 222*a*, the sixth arm 222*b*, the seventh arm 222*c*, and the eighth arm 222*d* in the region far from the second base end portion is wider than the width of each of the fifth arm 222*a*, the sixth arm 222*b*, the seventh arm 222*c*, and the eighth arm 222*d* in the region close to the second base end portion. The distance between the fifth arm 222*a* and the seventh arm 222*c* increases continuously or stepwise from the second base end portion of the third element section 220*a* or the second base end portion of the fourth element section 220*b* toward the tip of the fifth arm 222*a* and the tip of the seventh arm 222*c*. Accordingly, the distance between the fifth arm 222*a* and the seventh arm 222*c* in the region far from the second base end portion of the third element section 220*a* or the second base end portion of the fourth element section 220*b* is wider than the distance between the fifth arm 222*a* and the seventh arm 222*c* in the region close to the second base end portion of the third element section 220*a* or the second base end portion of the fourth element section 220*b*. Similarly, the distance between the sixth arm 222*b* and the eighth arm 222*d* increases continuously or stepwise from the second base end portion of the second element section 210*b* or the second base end portion of the fourth element section 220*b* toward the tip of the sixth arm 222*b* or the tip of the eighth arm 222*d*. Accordingly, the distance between the sixth arm 222*b* and the eighth arm 222*d* in the region far from the second base end portion of the third element section 220*a* or the second base end portion of the fourth element section 220*b* is wider than the distance between the sixth arm 222*b* and the eighth arm 222*d* in the region close to the second base end portion of the third element section 220*a* or the first base end portion of the fourth element section 220*b*. In this way, the fifth arm 222*a*, the sixth arm 222*b*, the seventh arm 222*c*, and the eighth arm 222*d* of the second element 220 operate as a self-similar antenna or an equivalent antenna.

When each of the first element 210 and the second element 220 includes a part operating as a self-similar antenna or an equivalent antenna, the antenna element 200 operates as, for example, a tapered slot antenna in a relatively high frequency band, and operates as, for example, a loop antenna in a relatively low frequency band. In a specific frequency band in an intermediate frequency band between a relatively high frequency band and a relatively low frequency band, the antenna element 200 operates as a dipole antenna. In each band between the relatively high frequency band, the relatively low frequency band, and the intermediate frequency band, the antenna element 200 operates with the operating principles of these antennas combined, that is, an integrated antenna. Accordingly, the antenna element 200 can operate stably over a wide frequency band even though it is one antenna element.

In the present embodiment, each of the third element section 220*a* and the fourth element section 220*b* is formed, for example, in one of a substantially C-shape, a substantially U-shape, a substantially V-shape, or a substantially n-shape, as described above for the first element section 210*a*.

The rate of change (rate of increase) of the width of each arm of the second element 220 from the second base end portion to the tip of each arm may be different from the rate of change (rate of increase) of the width of each arm of the first element 210 from the first base end portion to the tip of each arm. For example, the rate of change (rate of increase) of the width of each arm of the second element 220 may be smaller than the rate of change (rate of increase) of the width of each arm of the first element 210.

The first arm 212*a* and the fifth arm 222*a* include facing parts, that is, the first portion 214*a* and the fifth portion 224*a*, respectively. The first portion 214*a* of the first element section 210*a* and the fifth portion 224*a* of the third element section 220*a* face each other. Specifically, the first portion 214*a* of the first element section 210*a* and the fifth portion 224*a* of the third element section 220*a* face each other substantially in parallel.

The second arm 212*b* and the seventh arm 222*c* include facing parts, that is, the second portion 214*b* and the seventh portion 224*c*, respectively. The second portion 214*b* of the first element section 210*a* and the seventh portion 224*c* of the fourth element section 220*b* face each other. Specifically, the second portion 214*b* of the first element section 210*a* and the seventh portion 224*c* of the fourth element section 220*b* face each other substantially in parallel.

The third arm 212*c* and the sixth arm 222*b* include facing parts, that is, the third portion 214*c* and the sixth portion 224*b*, respectively. The third portion 214*c* of the first element section 210*a* and the sixth portion 224*b* of the third element section 220*a* face each other. Specifically, the third portion 214*c* of the first element section 210*a* and the sixth portion 224*b* of the third element section 220*a* face each other substantially in parallel.

The fourth arm 212*d* and the eighth arm 222*d* include facing parts, that is, the fourth portion 214*d* and the eighth portion 224*d*, respectively. The fourth portion 214*d* of the first element section 210*a* and the eighth portion 224*d* of the fourth element section 220*b* face each other. Specifically, the fourth portion 214*d* of the first element section 210*a* and the eighth portion 224*d* of the fourth element section 220*b* face each other substantially in parallel.

That each part of the first element 210 and each part of the second element 220 face each other substantially in parallel means not only that each part of the first element 210 and each part of the second element 220 face each other strictly in parallel but also that one of each part of the first element 210 and each part of the second element 220 is tilted by a slight angle (for example, +2.5 degrees or less) from the direction parallel to the other of each part of the first element 210 and each part of the second element 220.

As described above, at least a part of the first element 210 and at least a part of the second element 220 face each other. More specifically, a split ring (a shape in which a part of the ring is cut out and faced) is formed in each of between the facing parts of the first element 210 and the second element 220, that is, between the first portion 214*a* of the first element 210 and the fifth portion 224*a* of the second element 220, between the second portion 214*b* of the first element 210 and the seventh portion 224*c* of the second element 220, between the third portion 214*c* of the first element 210 and the sixth portion 224*b* of the second element 220, and between the fourth portion 214*d* of the first element 210 and the eighth portion 224*d* of the second element 220. Accordingly, the compatible band of the antenna element 200 can be expanded to a relatively low frequency band side.

As described above, the first element section 210*a* is turned by about 90 degrees with respect to the second element section 210*b*. In this case, the direction of polarization of the first element 210 and the direction of polarization of the second element 220 are orthogonal to each other. Specifically, since the first element 210 and the second element 220 have substantially the same shape, there is almost no difference in amplitude and phase between the linear polarization of the first element 210 and the linear polarization of the second element 220, which are orthogonal to each other, and the antenna element 200 receives circular polarization.

Next, the inclination of each of the first element section 210*a* and the second element section 210*b* with respect to the direction parallel to the mounting surface 122 of the base 100 will be described with reference to FIGS. 3 to 6. As will be described later with reference to FIGS. 3 to 6, at least one of the first element section 210*a* and the second element section 210*b* is tilted from the direction parallel to the mounting surface 122 of the base 100 toward the side (the negative direction side of the third direction Z) where the mounting surface 122 is located or the opposite side (the positive direction side of the third direction Z) of the side where the mounting surface 122 is located. Thereby, one of the first element section 210*a* and the second element section 210*b* can be arranged at an angle with respect to the other of the first element section 210*a* and the second element section 210*b*.

Figure 3:
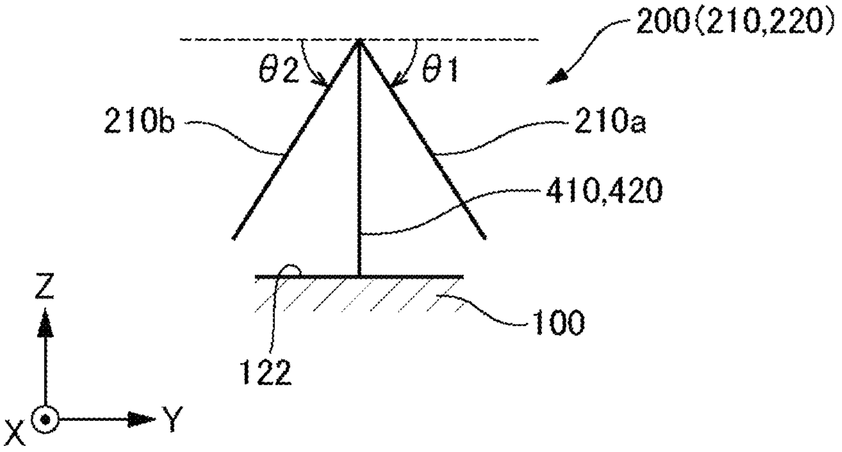
FIG. 3 is a diagram for explaining the details of the inclination of each of a first element section and a second element section with respect to a direction parallel to a mounting surface of a base in the example shown in FIG. 2.

FIG. 3 is a diagram for explaining the details of the inclination of each of the first element section 210*a* and the second element section 210*b* with respect to a direction parallel to the mounting surface 122 of the base 100 in the example shown in FIG. 2.

In FIG. 3, a part of the base 100, the first element 210 and the second element 220 of the antenna element 200, and the first feed line 410 and the second feed line 420 when viewed from the front of the vehicular antenna device 10 (FIG. 1 or 2) are schematically shown. In FIG. 3, the broken line passing through the upper ends of the first feed line 410 and the second feed line 420 indicates a direction parallel to the mounting surface 122 of the base 100. θ1 in FIG. 3 indicates the angle of inclination of the first element section 210*a* with respect to the direction parallel to the mounting surface 122 of the base 100. θ2 in FIG. 3 indicates the angle of inclination of the second element section 210*b* with respect to the direction parallel to the mounting surface 122 of the base 100. FIG. 3 does not show the second element 220. As described above, the facing parts of the first element 210 and the second element 220 are disposed substantially in parallel with each other. The matters described here with respect to FIG. 3 are the same in FIGS. 4 to 6 described later.

Figure 4:
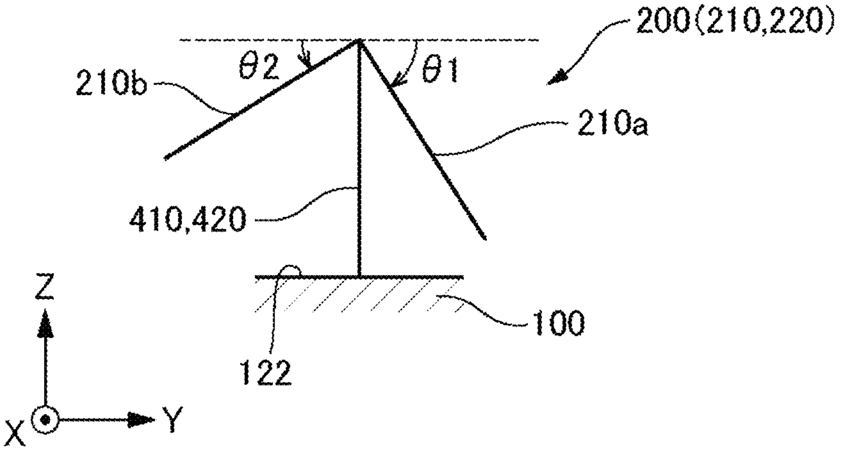
FIG. 4 is a diagram showing a first modification example of FIG. 3.
Figure 5:
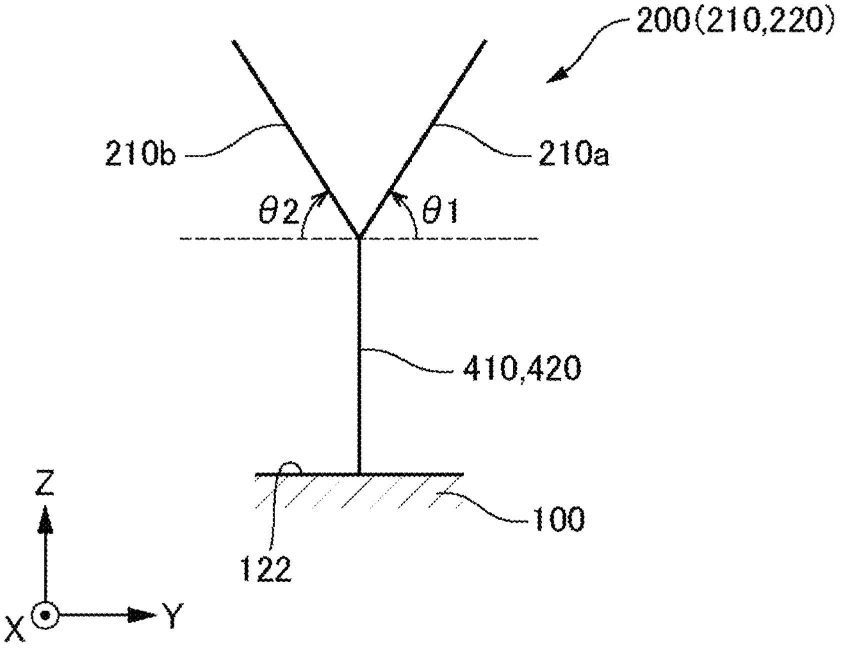
FIG. 5 is a diagram showing a second modification example of FIG. 3.
Figure 6:
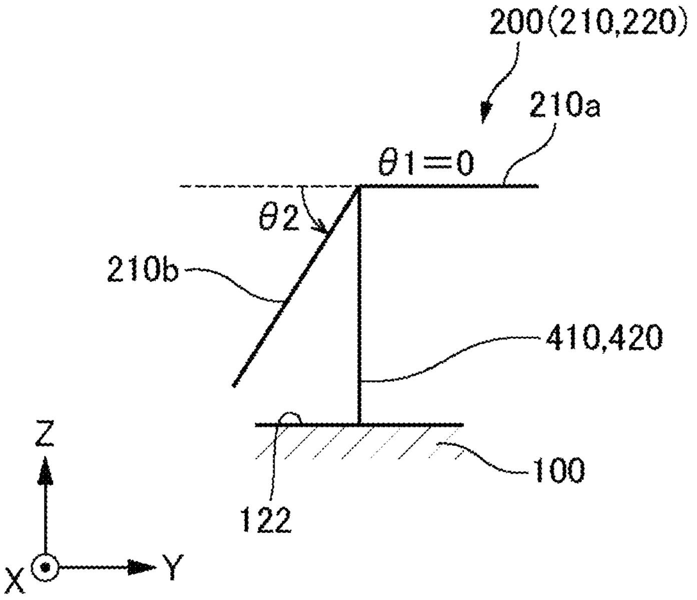
FIG. 6 is a diagram showing a third modification example of FIG. 3.

As described above, in the example shown in FIG. 3 (FIG. 2), the angle θ1 of the inclination of the first element section 210*a* with respect to the direction parallel to the mounting surface 122 of the base 100 and the angle θ2 of the inclination of the second element section 210*b* with respect to the direction parallel to the mounting surface 122 of the base 100 are substantially equal to each other. Each of the angle θ1 and the angle θ2 is, for example, greater than 0 degrees and 70 degrees or less. In FIGS. 4 to 6 described later, each of the angle θ1 and the angle θ2 is, for example, greater than 0 degrees and 70 degrees or less, unless otherwise specified. When each of the angle θ1 and the angle θ2 is in the above range, the decrease from the characteristics (for example, gain or axial ratio) of the antenna element 200 with the first element section 210*a* and the second element section 210*b* disposed parallel to each other can be suppressed within a sufficiently acceptable range, and the length of the first element 210 in the facing direction of the first element section 210*a* and the second element section 210*b* can be shortened.

FIG. 4 is a diagram showing a first modification example of FIG. 3.

The first element section 210*a* and the second element section 210*b* are tilted by different angles from the direction parallel to the mounting surface 122 of the base 100 toward the side where the mounting surface 122 of the base 100 is located. In the example shown in FIG. 4, the angle θ1 of the inclination of the first element section 210*a* with respect to the direction parallel to the mounting surface 122 of the base 100 is larger than the angle θ2 of the inclination of the second element section 210*b* with respect to the direction parallel to the mounting surface 122 of the base 100.

The angle θ1 of the inclination of the first element section 210*a* with respect to the direction parallel to the mounting surface 122 of the base 100 may be smaller than the angle θ2 of the inclination of the second element section 210*b* with respect to the direction parallel to the mounting surface 122 of the base 100.

Even in the present modification example, the length of the first element 210 in the facing direction of the first element section 210*a* and the second element section 210*b* can be shortened, as compared to the case where one of the first element section 210*a* and the second element section 210*b* is not tilted with respect to the other of the first element section 210*a* and the second element section 210*b*, such as the case where the first element section 210*a* and the second element section 210*b* are disposed in parallel with the mounting surface 122 of the base 100. Even in the present modification example, as compared with the case where the first element section 210*a* and the second element section 210*b* are tilted toward the opposite side to the side where the mounting surface 122 is located, the length of the first element 210 in the height direction of the vehicular antenna device 10 (FIG. 1 or FIG. 2) can be shortened. Further, in the present modification example, the radiation directivity of the antenna element 200 can be tilted from the zenith direction toward a desired direction, by adjusting the angle of inclination of each of the first element section 210*a* and the second element section 210*b* with respect to the direction parallel to the mounting surface 122 of the base 100.

FIG. 5 is a diagram showing a second modification example of FIG. 3.

The first element section 210*a* and the second element section 210*b* are tilted from the direction parallel to the mounting surface 122 toward the opposite side to the side where the mounting surface 122 is located. In the example shown in FIG. 5, the angle θ1 of the inclination of the first element section 210*a* with respect to the direction parallel to the mounting surface 122 of the base 100 and the angle θ2 of the inclination of the second element section 210*b* with respect to the direction parallel to the mounting surface 122 of the base 100 are substantially equal to each other. However, the angle θ1 of the inclination of the first element section 210*a* with respect to the direction parallel to the mounting surface 122 of the base 100 and the angle θ2 of the inclination of the second element section 210*b* with respect to the direction parallel to the mounting surface 122 of the base 100 may be different from each other.

Even in the present modification example, the length of the antenna element 200 in the left-right direction of the vehicular antenna device 10 (FIG. 1 or 2) can be shortened, as compared with the case where both the first element section 210*a* and the second element section 210*b* are disposed in parallel with the mounting surface 122 of the base 100.

FIG. 6 is a diagram showing a third modification example of FIG. 3.

The first element section 210*a* is disposed in parallel with the mounting surface 122 of the base 100, while the second element section 210*b* is tilted from a direction parallel to the mounting surface 122 of the base 100 toward the side where the mounting surface 122 of the base 100 is located. The first element section 210*a* may be tilted from a direction parallel to the mounting surface 122 of the base 100 toward the opposite side to the side where the mounting surface 122 of the base 100 is located.

Even in the present modification example, the length of the antenna element 200 in the left-right direction of the vehicular antenna device 10 (FIG. 1 or 2) can be shortened, as compared with the case where both the first element section 210*a* and the second element section 210*b* are disposed in parallel with the mounting surface 122 of the base 100.

Figure 7:
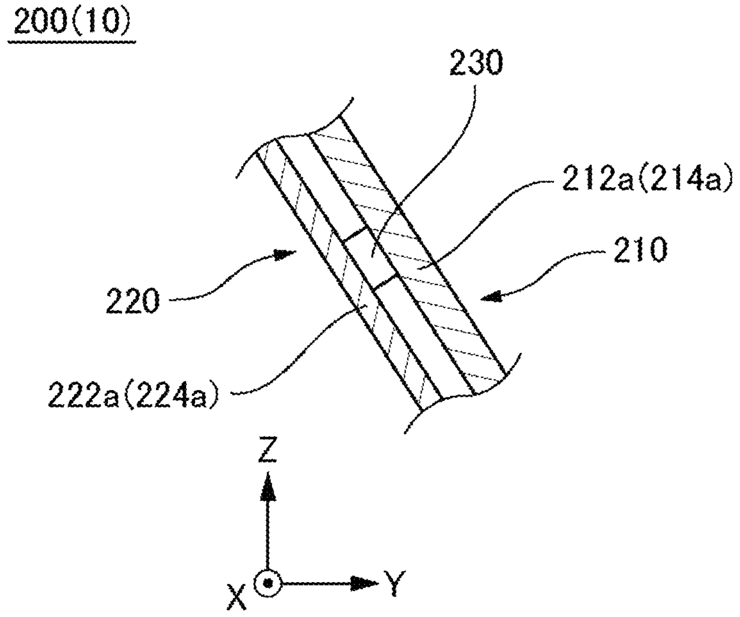
FIG. 7 is a diagram for explaining the details of the region between facing portions of the first element and the second element.

FIG. 7 is a diagram for explaining the details of the region between facing parts of the first element 210 and the second element 220. FIG. 7 shows a cross-sectional view of the first portion 214*a* of the first element 210 and the fifth portion 224*a* of the second element 220 in a direction perpendicular to the front-rear direction of the vehicular antenna device 10.

The vehicular antenna device 10 includes an insulator 230. The insulator 230 is disposed between the first portion 214*a* of the first element 210 and the fifth portion 224*a* of the second element 220. The insulator 230 is, for example, a resin. The insulator 230 can suppress contact between the first portion 214*a* of the first element 210 and the fifth portion 224*a* of the second element 220. The insulator 230 also serves as a spacer for adjusting the width of the region (gap) between the first portion 214*a* of the first element 210 and the fifth portion 224*a* of the second element 220.

The insulator 230 may be disposed not only between the first portion 214*a* of the first element 210 and the fifth portion 224*a* of the second element 220, but also between the other facing parts of the first element 210 and the second element 220, that is, between the second portion 214*b* of the first element 210 and the seventh portion 224*c* of the second element 220, between the third portion 214*c* of the first element 210 and the sixth portion 224*b* of the second element 220, and between the fourth portion 214*d* of the first element 210 and the eighth portion 224*d* of the second element 220. The insulator 230 may not be disposed in all of these four regions, and may be disposed in at least one place of these four regions.

Figure 8:
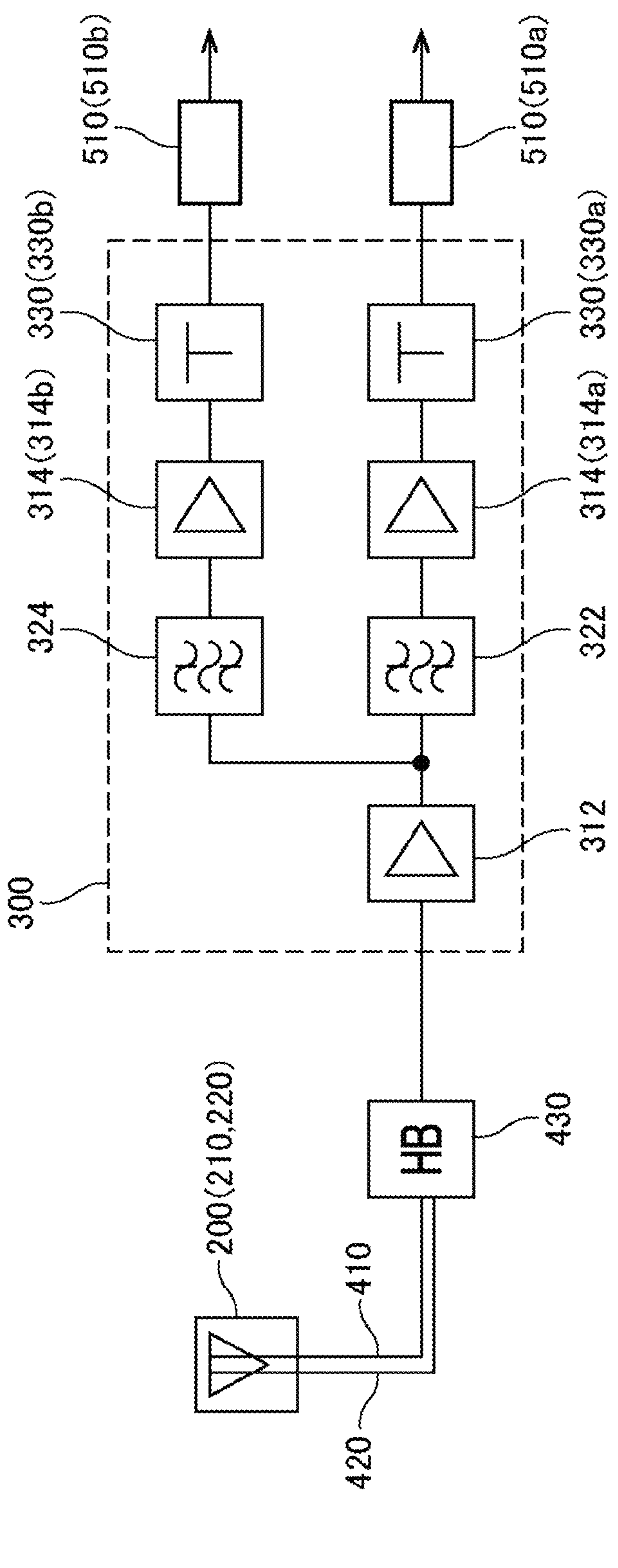
FIG. 8 is a block diagram showing a first example of the details of a circuit portion shown in FIG. 2.

FIG. 8 is a block diagram showing a first example of the details of the circuit portion 300 shown in FIG. 2.

The circuit portion 300 includes a first-stage amplifier 312, a first bandpass filter (first BPF) 322, a second bandpass filter (second BPF) 324, two second-stage amplifiers 314 (first second-stage amplifier 314*a* and a second second-stage amplifier 314*b*), and two attenuators 330 (first attenuator 330*a* and second attenuator 330*b*).

The first feed line 410 and the second feed line 420 are electrically connected to the circuit portion 300 via a hybrid circuit 430. The hybrid circuit 430 imparts a 90 degrees phase difference to the signal sent to the first feed line 410 connected to the first element 210 and the signal sent to the second feed line 420 connected to the second element 220. The hybrid circuit 430 combines the signal from the first feed line 410 and the signal from the second feed line 420. The hybrid circuit 430 is provided, for example, on the lower surface (the surface on the negative direction side of the third direction Z) of the circuit portion 300. In this example, the lower end (the end on the negative direction side of the third direction Z) of each of the first feed line 410 and the second feed line 420 is connected to the hybrid circuit 430. In the present embodiment, the hybrid circuit 430 is present inside the circuit portion 300. However, the hybrid circuit 430 may be present in a region different from the inside of the circuit portion 300. The hybrid circuit 430 includes, for example, a low-pass filter portion imparting a −45 degrees phase difference to a signal and having a predetermined characteristic impedance (for example, 50Ω), and a high-pass filter portion imparting a +45 degrees phase difference to a signal and having a predetermined characteristic impedance (for example, 50Ω). These low-pass filter portion and high-pass filter portion impart a 90 degrees phase difference to the signal to the first feed line 410 and the signal to the second feed line 420. The hybrid circuit 430 allows the antenna element 200 to receive circular polarization.

The circuit portion 300 functions as a Low Noise Amplifier (LNA). Specifically, first, the signals sent from the first feed line 410 and the second feed line 420 and combined by the hybrid circuit 430 are amplified by the first-stage amplifier 312. The signal amplified by the first-stage amplifier 312 is sent to the first BPF 322 and the second BPF 324. The first BPF 322 passes, for example, L1 band and L band signals. The second BPF 324 passes, for example, L5 band, L2 band and L6 band signals. The signal extracted by the first BPF 322 is amplified by the first second-stage amplifier 314*a* and then sent to the first cable 510*a* via the first attenuator 330*a*. On the other hand, the signal passing through the second BPF 324 is amplified by the second second-stage amplifier 314*b* and then sent to the second cable 510*b* via the second attenuator 330*b*.

Figure 9:
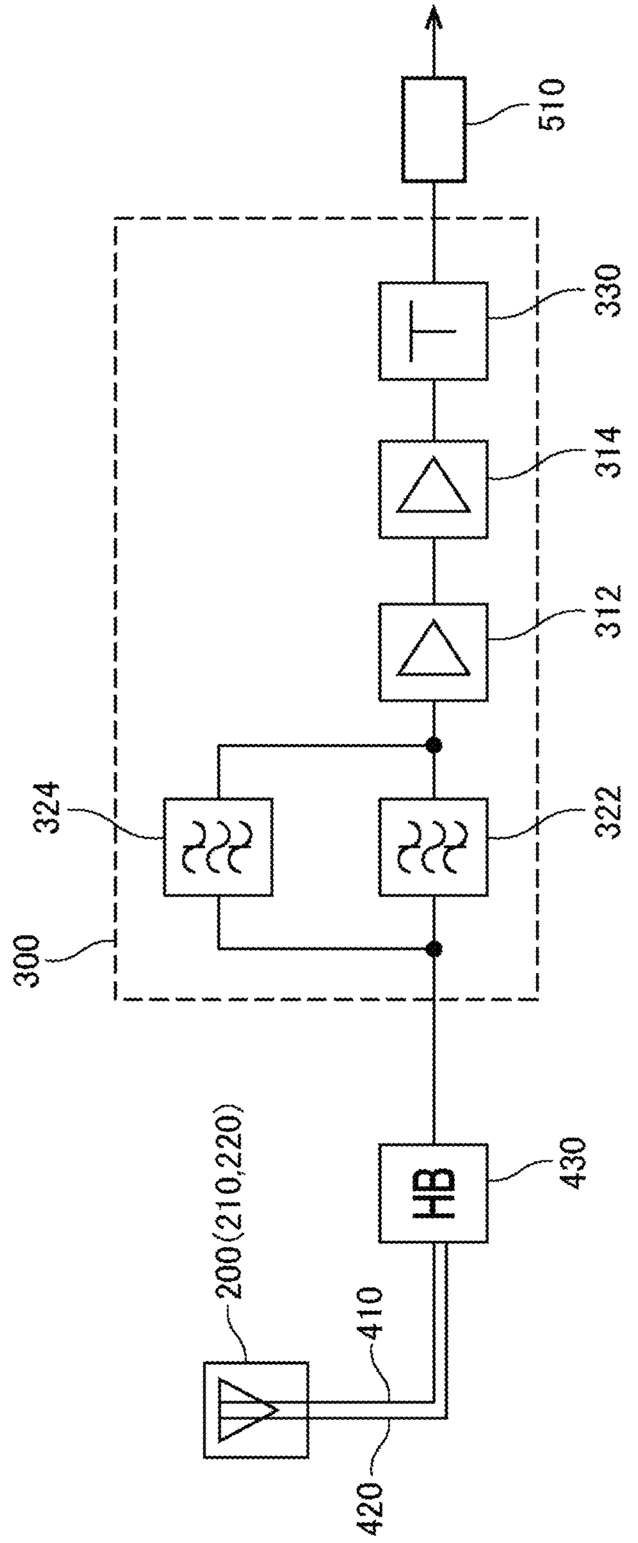
FIG. 9 is a block diagram showing a second example of the details of the circuit portion shown in FIG. 2.

FIG. 9 is a block diagram showing a second example of the details of the circuit portion 300 shown in FIG. 2. The example shown in FIG. 9 is the same as the example shown in FIG. 8 except for the following points. That is, in the example shown in FIG. 9, the signals sent from the first feed line 410 and the second feed line 420 and combined by the hybrid circuit 430 are sent to the parallel-connected first BPF 322 and second BPF 324. The signal passing through the first BPF 322 and the signal passing through the second BPF 324 are amplified by the first-stage amplifier 312, further amplified by the second-stage amplifier 314, and sent to the cable 510 via the attenuator 330.

Figure 10:
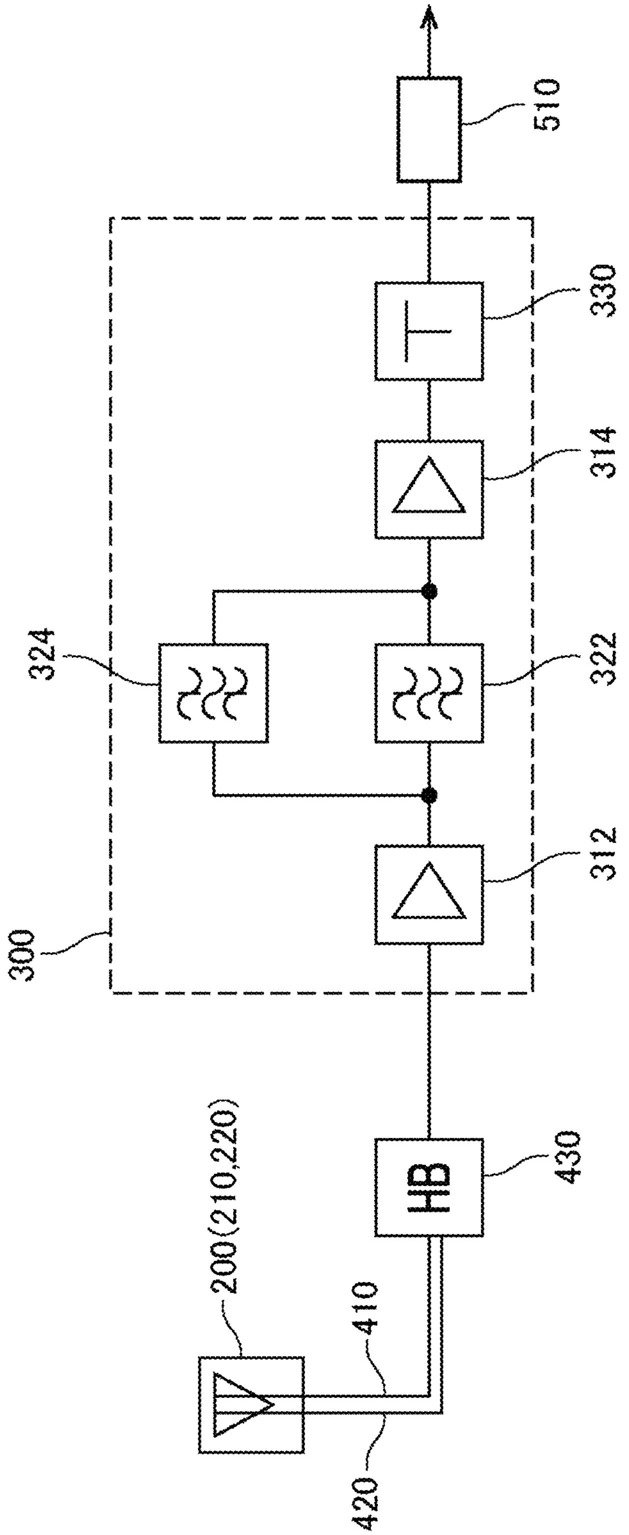
FIG. 10 is a block diagram showing a third example of the details of the circuit portion shown in FIG. 2.

FIG. 10 is a block diagram showing a third example of the details of the circuit portion 300 shown in FIG. 2. The example shown in FIG. 10 is the same as the example shown in FIG. 9 except that the parallel-connected first BPF 322 and second BPF 324 are disposed between the first-stage amplifier 312 and the second-stage amplifier 314. That is, in the example shown in FIG. 10, the signals sent from the first feed line 410 and the second feed line 420 and combined by the hybrid circuit 430 are amplified by the first-stage amplifier 312 and sent to the first BPF 322 and the second BPF 324. The signal passing through the first BPF 322 and the signal passing through the second BPF 324 are amplified by the second-stage amplifier 314, and sent to the cable 510 via the attenuator 330.

Figure 11:
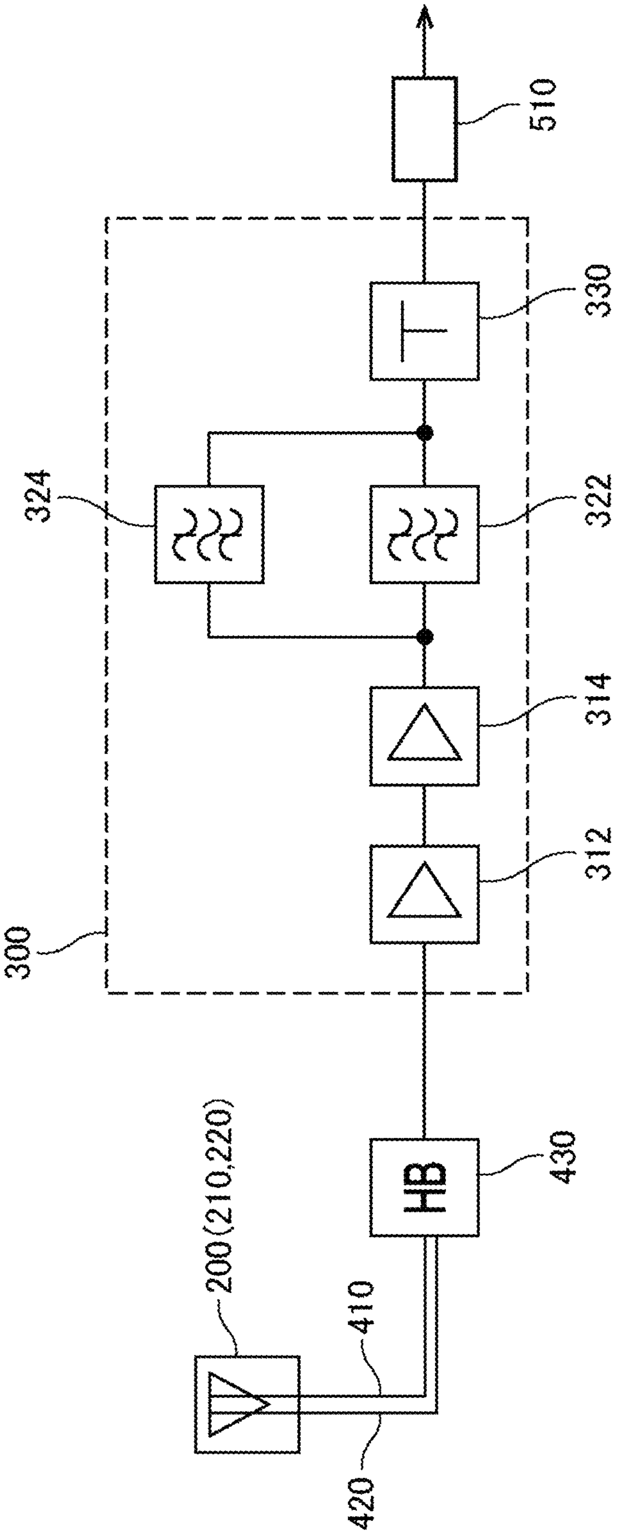
FIG. 11 is a block diagram showing a fourth example of the details of the circuit portion shown in FIG. 2.

FIG. 11 is a block diagram showing a fourth example of the details of the circuit portion 300 shown in FIG. 2. The example shown in FIG. 11 is the same as the example shown in FIG. 9 except that the first-stage amplifier 312 and the second-stage amplifier 314 are disposed between the hybrid circuit 430 and the parallel-connected first BPF 322 and second BPF 324. That is, in the example shown in FIG. 11, the signals sent from the first feed line 410 and the second feed line 420 and combined by the hybrid circuit 430 are amplified by the first-stage amplifier 312, are further amplified by the second-stage amplifier 314, and sent to the first BPF 322 and the second BPF 324. The signal passing through the first BPF 322 and the signal passing through the second BPF 324 are sent to the cable 510 via the attenuator 330.

Figure 12:
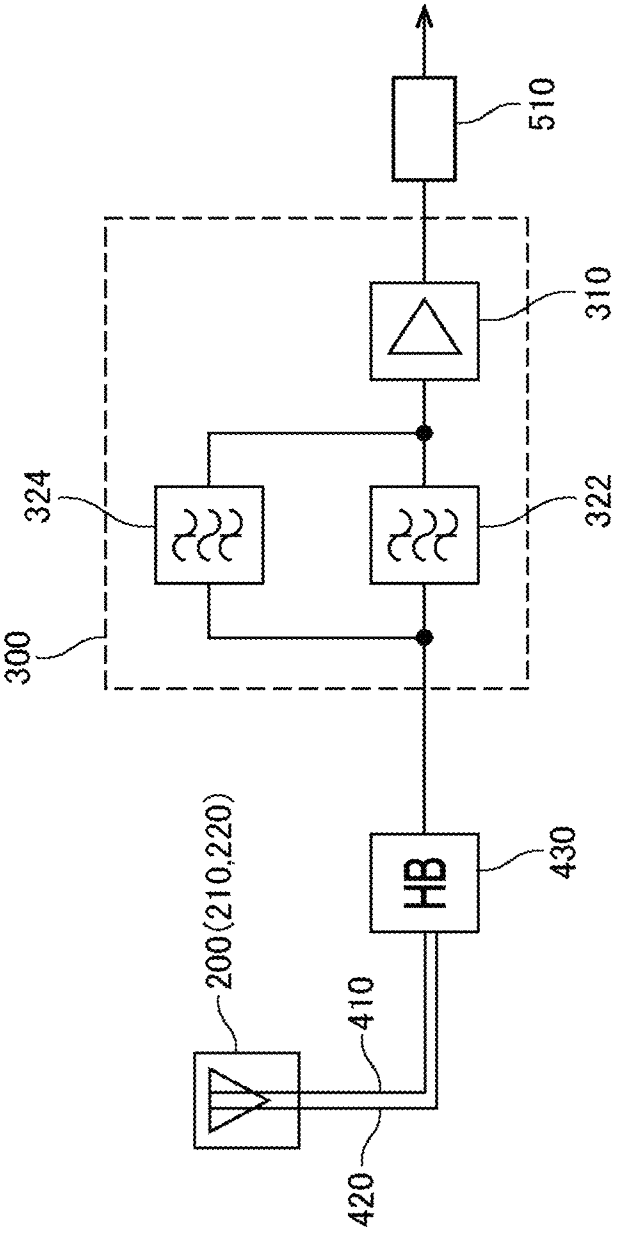
FIG. 12 is a block diagram showing a fifth example of the details of the circuit portion shown in FIG. 2.

FIG. 12 is a block diagram showing a fifth example of the details of the circuit portion 300 shown in FIG. 2. The example shown in FIG. 12 is the same as the example shown in FIG. 9 except that there is only a one-stage amplifier (amplifier 310), instead of the two-stage amplifiers (the first-stage amplifier 312 and the second-stage amplifier 314 in FIG. 9), and the attenuator 330 (FIG. 9) is not provided. That is, in the example shown in FIG. 12, the signals sent from the first feed line 410 and the second feed line 420 and combined by the hybrid circuit 430 are sent to the first BPF 322 and the second BPF 324. The signal passing through the first BPF 322 and the signal passing through the second BPF 324 are amplified by the amplifier 310, and sent to the cable 510.

Figure 13:
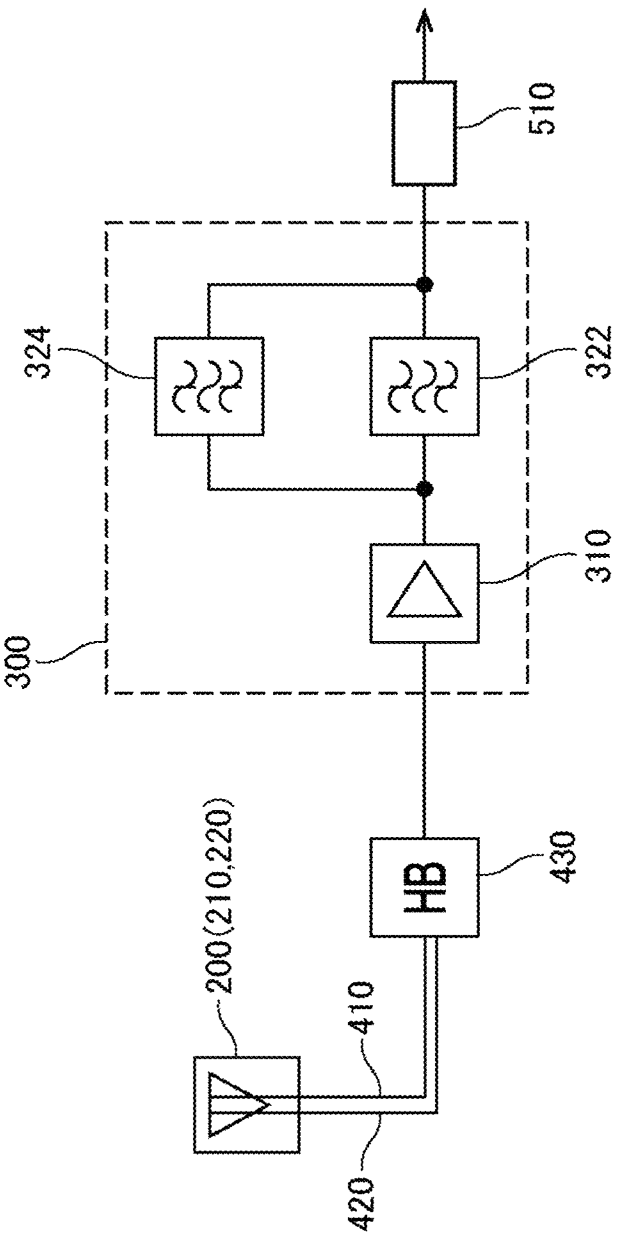
FIG. 13 is a block diagram showing a sixth example of the details of the circuit portion shown in FIG. 2.

FIG. 13 is a block diagram showing a sixth example of the details of the circuit portion 300 shown in FIG. 2. The example shown in FIG. 13 is the same as the example shown in FIG. 12 except that the amplifier 310 is disposed between the hybrid circuit 430 and the parallel-connected first BPF 322 and second BPF 324. That is, in the example shown in FIG. 13, the signals sent from the first feed line 410 and the second feed line 420 and combined by the hybrid circuit 430 are amplified by the amplifier 310 and sent to the first BPF 322 and the second BPF 324. The signal passing through the first BPF 322 and the signal passing through the second BPF 324 are sent to the cable 510 as they are.

Figure 14:
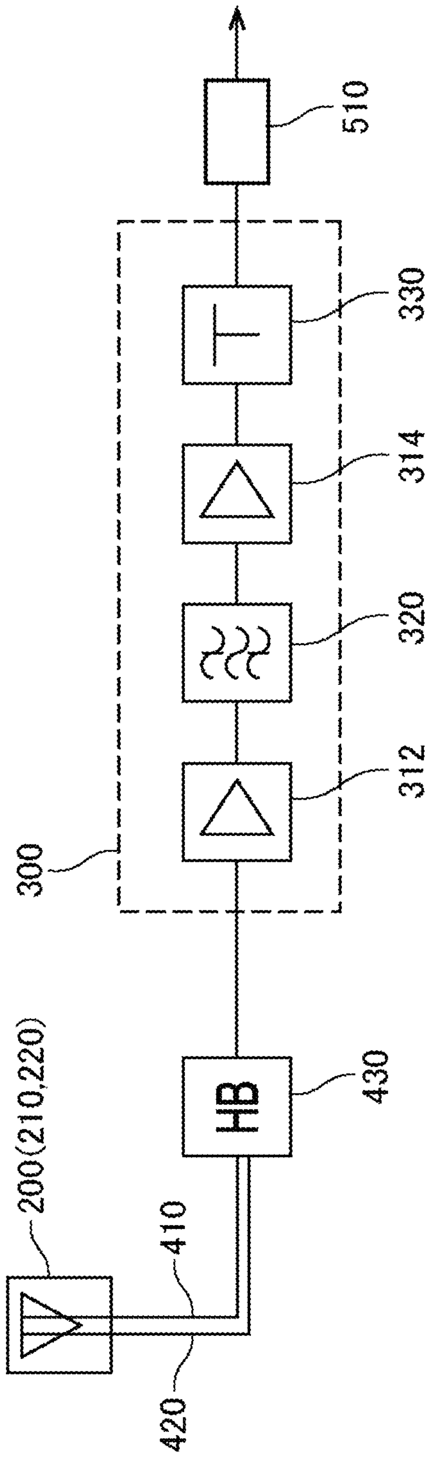
FIG. 14 is a block diagram showing a seventh example of the details of a circuit portion 300 shown in FIG. 2.

FIG. 14 is a block diagram showing a seventh example of the details of the circuit portion 300 shown in FIG. 2. The example shown in FIG. 14 is the same as the example shown in FIG. 10 except that the BPF 320 is disposed instead of the first BPF 322 and the second BPF 324 (FIG. 10). That is, in the example shown in FIG. 14, the signals sent from the first feed line 410 and the second feed line 420 and combined by the hybrid circuit 430 are amplified by the first-stage amplifier 312 and sent to the BPF 320. The BPF 320 passes, for example, L1 band and L band signals and L5 band, L2 band and L6 band signals. The signal extracted by the BPF 320 is amplified by the second-stage amplifier 314 and sent to the cable 510 via the attenuator 330.

In the example shown in FIGS. 8 to 13, an electrical path passing through a BPF (first BPF 322) for extracting L1 band and L band signals and an electrical path passing through a BPF (second BPF 324) for extracting L5 band, L2 band, and L6 band signal are split. In the example shown in FIGS. 9 to 13, the first BPF 322 and the second BPF 324 are connected in parallel. In the example shown in FIGS. 8 to 13, gains and axial ratios can be better in the L1 band, L band, L5 band, L2 band and L6 band, as compared with the case a single BPF (BPF 320) passes the L1 band and L band signals and the L5 band, L2 band, and L6 band signals as shown in FIG. 14.

In the example shown in FIGS. 8 to 14, the circuit portion 300 has an amplifier and a bandpass filter in the subsequent stage of the hybrid circuit 430 with respect to the antenna element 200. Accordingly, the circuit portion 300 can function as an LNA.

Figure 15:
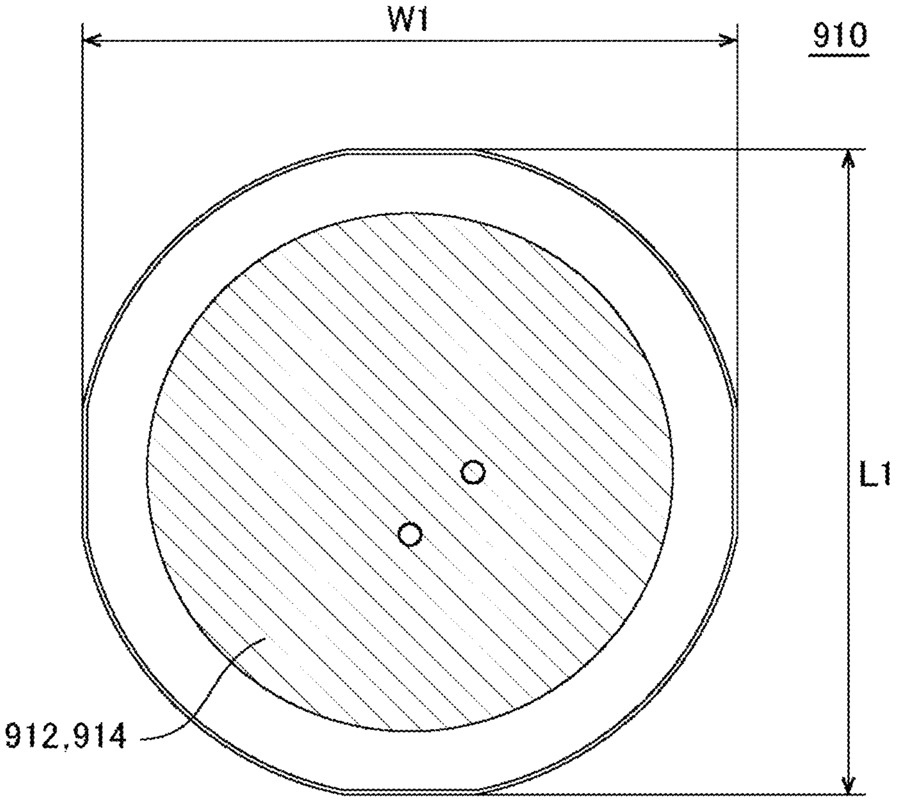
FIG. 15 is a top view of a first stacked patch antenna according to comparative embodiment 1.
Figure 16:
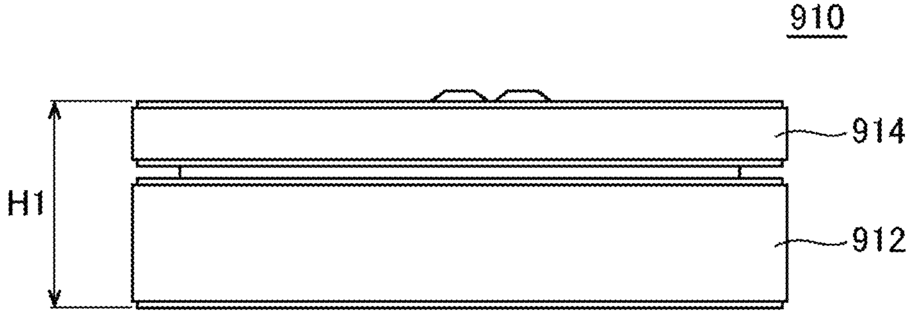
FIG. 16 is a side view of the first stacked patch antenna shown in FIG. 15.

FIG. 15 is a top view of a first stacked patch antenna 910 according to comparative embodiment 1. FIG. 16 is a side view of the first stacked patch antenna 910 shown in FIG. 15.

The first stacked patch antenna 910 includes a first patch antenna 912 and a second patch antenna 914. The second patch antenna 914 is stacked on the first patch antenna 912. When viewed from above the first stacked patch antenna 910, each of the first patch antenna 912 and the second patch antenna 914 has a substantially circular shape. The size of the first stacked patch antenna 910 is 41 mm for the length L1, 41 mm for the width W1 and 13 mm for the height H1.

Figure 17:
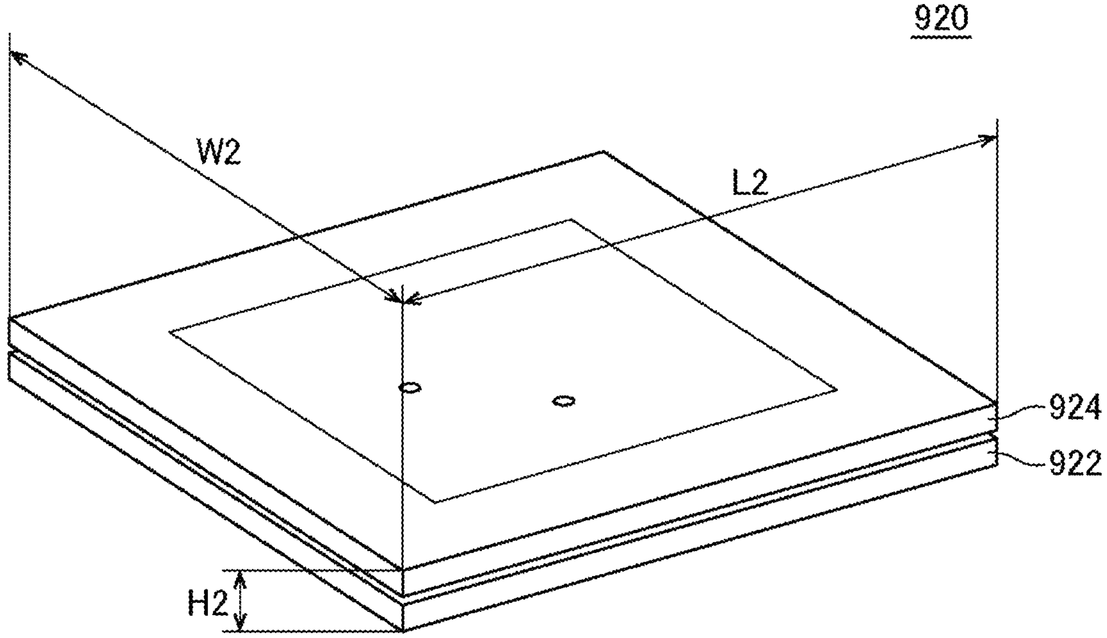
FIG. 17 is a perspective view of a second stacked patch antenna according to comparative embodiment 2.

FIG. 17 is a perspective view of a second stacked patch antenna 920 according to the comparative embodiment 2.

The second stacked patch antenna 920 includes a third patch antenna 922 and a fourth patch antenna 924. The fourth patch antenna 924 is stacked on the third patch antenna 922. When viewed from above the second stacked patch antenna 920, the third patch antenna 922 and the fourth patch antenna 924 have a substantially square shape. The size of the first stacked patch antenna 910 is 80 mm for the length L2, 80 mm for the width W2, and 7.45 mm for the height H2.

Figure 18:
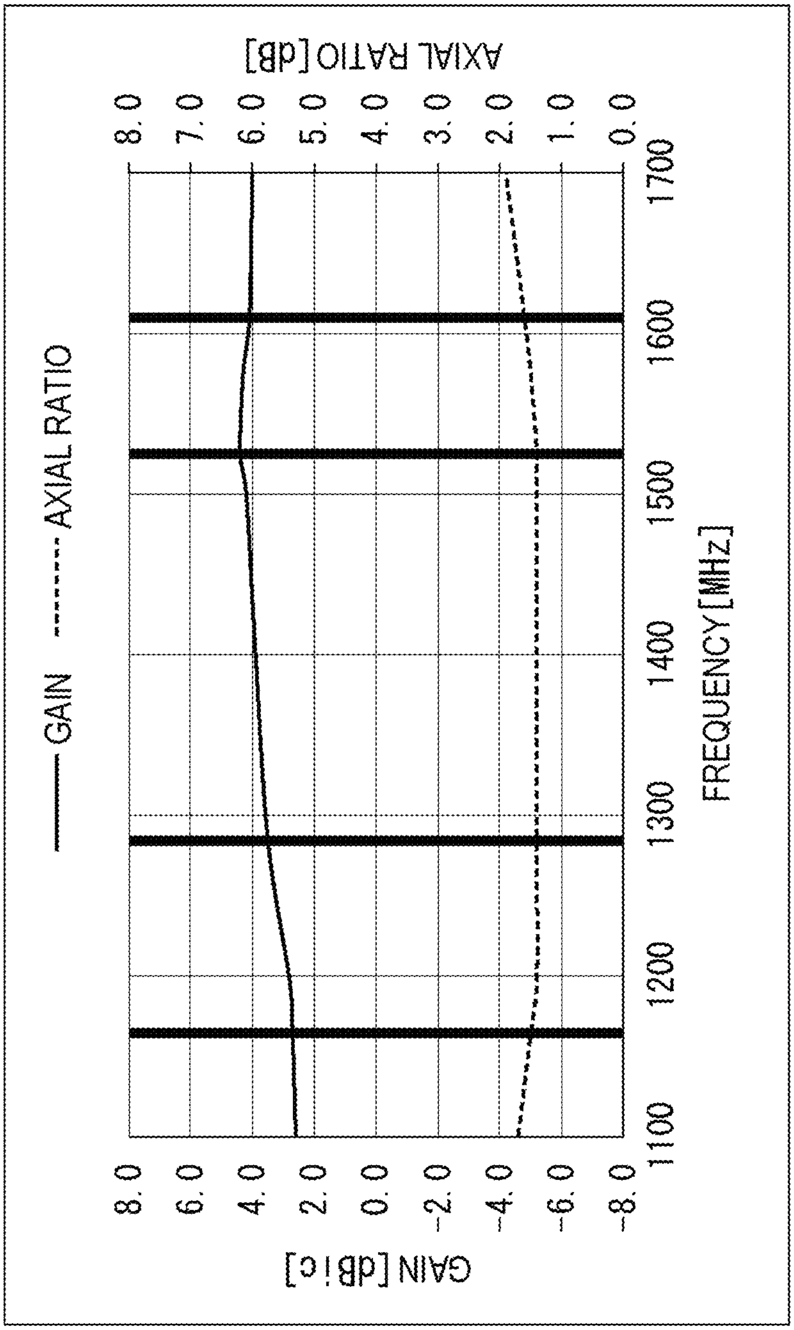
FIG. 18 is a graph showing frequency characteristics of gain and axial ratio of the antenna element (FIG. 2) according to the embodiment in the range of 1100 MHz to 1700 MHZ.
Figure 19:
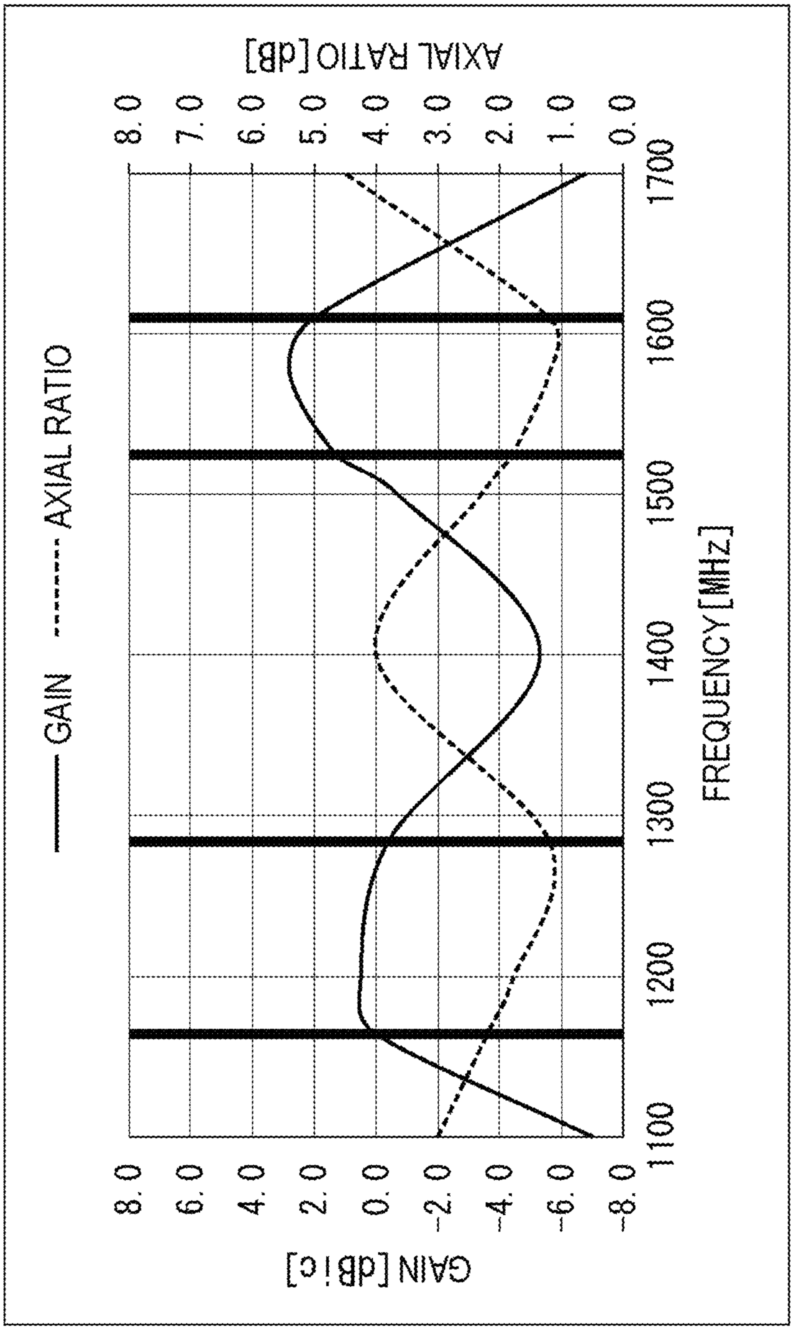
FIG. 19 is a graph showing frequency characteristics of gain and axial ratio of the first stacked patch antenna (FIGS. 15 and 16) according to comparative embodiment 1 at 1100 MHz to 1700 MHZ.
Figure 20:
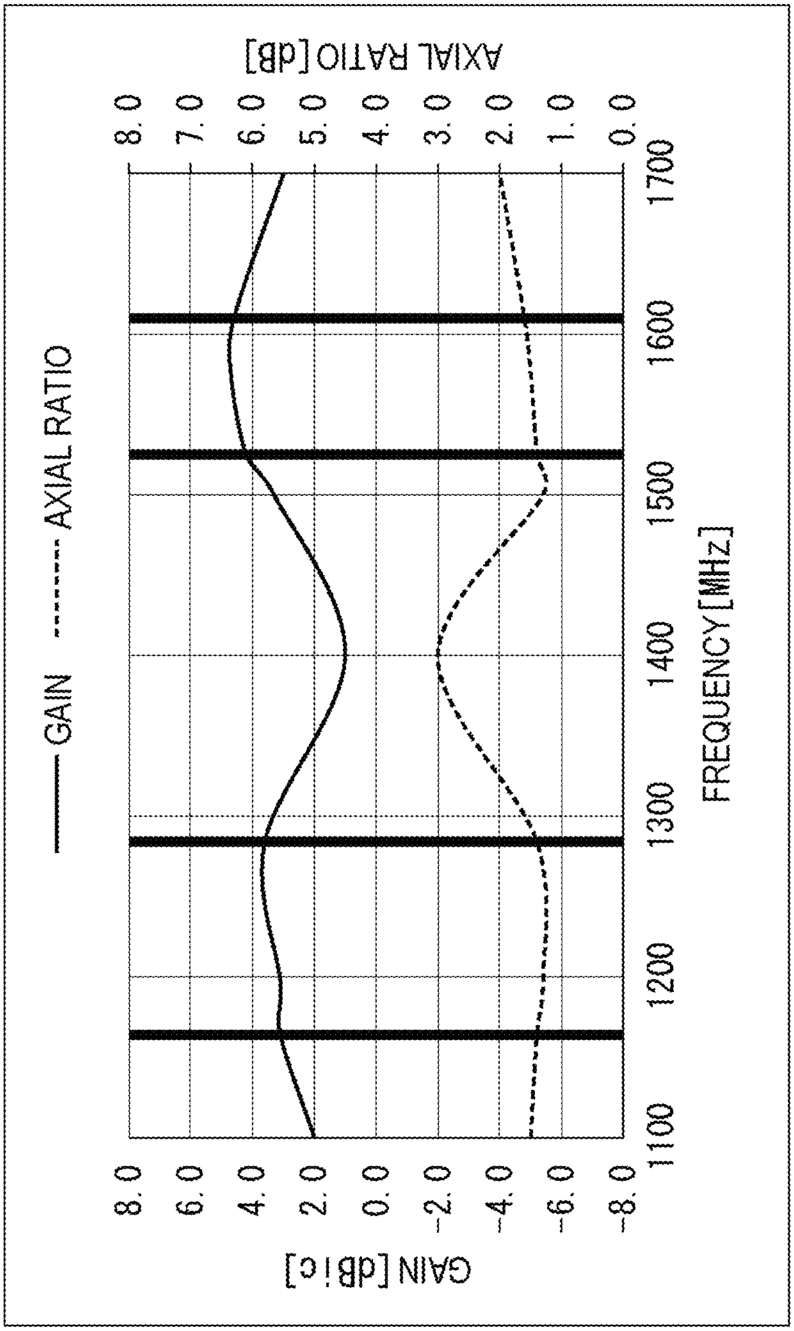
FIG. 20 is a graph showing frequency characteristics of gain and axial ratio of the second stacked patch antenna (FIG. 17) according to comparative embodiment 2 at 1100 MHz to 1700 MHZ.

FIG. 18 is a graph showing frequency characteristics of gain and axial ratio of the antenna element 200 (FIG. 2) according to the embodiment in the range of 1100 MHz to 1700 MHZ. FIG. 19 is a graph showing frequency characteristics of gain and axial ratio of the first stacked patch antenna 910 (FIGS. 15 and 16) according to comparative embodiment 1 at 1100 MHz to 1700 MHZ. FIG. 20 is a graph showing frequency characteristics of gain and axial ratio of the second stacked patch antenna 920 (FIG. 17) according to comparative embodiment 2 at 1100 MHz to 1700 MHZ.

In FIGS. 18 to 20, the horizontal axis of the graph indicates frequency. The vertical axis on the left side of the graph shows the gain (dBic), and the solid line in the graph shows the frequency characteristics of the gain. The vertical axis on the right side of the graph indicates the axial ratio (dB), and the broken line in the graph indicates the frequency characteristic of the axial ratio. In the graph, the region between the thick vertical line at a frequency of about 1165 MHz and the thick vertical line at a frequency of about 1285 MHz is the L5 band, L2 band, and L6 band. In the graph, the region between the thick vertical line at a frequency of about 1525 MHz and the thick vertical line at a frequency of about 1610 MHz is the L1 band and L band.

The size of the antenna element 200 according to the embodiment is 70 mm in length (the first direction X in FIG. 2), 35 mm in width (the second direction Y in FIG. 2), and 42 mm in height (the third direction Z in FIG. 2). That is, when viewed from the height direction (third direction Z) of the antenna element 200, the space required for installing the antenna element 200 can be estimated as a rectangle with an area of 2450 $mm^2$ (70 mm (first direction X)×35 mm (second direction Y)). On the other hand, according to the above description, when viewed from the height direction of the first stacked patch antenna 910 according to comparative embodiment 1, the space required for installing the first stacked patch antenna 910 can be estimated as a rectangle (41 mm×41 mm) with an area of 1681 $mm^2$. When viewed from the height direction of the second stacked patch antenna 920 according to comparative embodiment 2, the space required for installing the second stacked patch antenna 920 can be estimated as a rectangle (80 mm×80 mm) with an area of 6400 $mm^2$.

Based on the comparison between the frequency characteristics of the first stacked patch antenna 910 according to comparative embodiment 1 (FIG. 19) and the frequency characteristics of the second stacked patch antenna 920 according to comparative embodiment 2 (FIG. 20), in order to obtain sufficient performance (gain 2.0 dBic or more and axial ratio 4.0 dB or less) in both the gain and the axial ratio in the L1 band, the L band, and the L5 band, the L2 band, and the L6 band of the stacked patch antenna, a rectangular space having an area of at least 6400 $mm^2$ (a space required for installing the second stacked patch antenna 920 according to comparative embodiment 2) is required when viewed from the height direction of the stacked patch antenna. On the other hand, from the frequency characteristics of the embodiment (FIG. 15), in the antenna element 200 according to the embodiment, sufficient performance (gain 2.0 dBic or more, axial ratio 4.0 dB or less) is obtained in both the gain and the axial ratio in the L1 band, the L band, and the L5 band, the L2 band, and the L6 band, with a rectangular space having an area of 2450 $mm^2$ when viewed from the height direction of the antenna element 200. Thus, in the antenna element 200 according to the embodiment, sufficient performance (gain 2.0 dBic or more and an axial ratio 4.0 dB or less) can be obtained in both the gain and the axial ratio in the L1 band, the L band, the L5 band, the L2 band, and the L6 band in a space smaller than the space of the stacked patch antenna.

Although the embodiment and modification examples of the present invention have been described above with reference to the drawings, these are examples of the present invention, and various configurations other than the above may be adopted.

In the present embodiment, the first element 210 and the second element 220 of the antenna element 200 are physically supported on the mounting surface 122 of the base 100 by the first feed line 410 and the second feed line 420. However, the first element 210 and the second element 220 of the antenna element 200 may be physically supported on the mounting surface 122 of the base 100 by an insulating block such as a resin block.

In the present embodiment, the first element 210 and the second element 220 of the antenna element 200 are made of sheet metal.

However, the first element 210 and the second element 220 of the antenna element 200 may be made of a conductive pattern patterned on an insulating block such as a resin block.

In the present embodiment, the vehicular antenna device 10 includes a base 100, an antenna element 200, a circuit portion 300, a first feed line 410, and a second feed line 420. However, one or more other antenna elements may be provided, and for example, an antenna element for Long Term Evolution (LTE), an antenna element for Vehicle-to-Everything (V2X), and the like may be further provided.

In the present embodiment, the first feed line 410 and the second feed line 420 are coaxial lines, but may be microstrip lines provided on the substrate.

According to the present specification, the following aspects are provided.

(Aspect 1)

Aspect 1 is a vehicular antenna device including:

an antenna element operable in at least two or more of frequency bands including L1 band, L band, L5 band, L2 band, and L6 band and receiving circular polarization, in which the antenna element includes a first element having a first feed portion, and a first element section and a second element section arranged at opposite sides of the first feed portion, and a second element having a second feed portion, and a third element section and a fourth element section arranged at opposite sides of the second feed portion, at least a part of the first element and at least a part of the second element face each other, and one of the first element section and the second element section is arranged at an angle with respect to the other of the first element section and the second element section.

According to Aspect 1, as compared with the case where one of the first element section and the second element section is not arranged at an angle with respect to the other of the first element section and the second element section, the length of the first element in the facing direction of the first element section and the second element section can be shortened. According to Aspect 1, a part of the first element and a part of the second element face each other. Accordingly, the compatible band of the antenna element can be expanded. Thus, the vehicular antenna device compatible with a wide range of bands within a multi-band including the L1 band, the L band, the L5 band, the L2 band, and the L6 band can be miniaturized.

(Aspect 2)

Aspect 2 is the vehicular antenna device according to Aspect 1, in which the first element section has a first portion and a second portion, the second element section has a third portion and a fourth portion, the third element section has a fifth portion and a sixth portion, the fourth element section has a seventh portion and an eighth portion, the first portion of the first element section and the fifth portion of the third element section face each other, the second portion of the first element section and the seventh portion of the fourth element section face each other, the third portion of the second element section and the sixth portion of the third element section face each other, and the fourth portion of the second element section and the eighth portion of the fourth element section face each other.

According to Aspect 2, since each portion of the first element section and each portion of the second element section face each other, the compatible band of the antenna element can be expanded to the relatively low frequency band side.

(Aspect 3)

Aspect 3 is the vehicular antenna device according to Aspect 2, in which the first element and the second element have substantially the same shape, and the fifth portion, the sixth portion, the seventh portion, and the eighth portion are turned by about 90 degrees with respect to the third portion, the fourth portion, the first portion, and the second portion, respectively.

According to Aspect 3, the direction of polarization of the first element and the direction of polarization of the second element are orthogonal to each other. Specifically, since the first element and the second element have substantially the same shape, there is almost no difference in amplitude and phase between the linear polarization of the first element and the linear polarization of the second element, which are orthogonal to each other, and the antenna element receives circular polarization.

(Aspect 4)

Aspect 4 is the vehicular antenna device according to any one of Aspects 1 to 3, in which the first element section and the second element section of the first element, and the third element section and the fourth element section of the second element each have a portion operating as a self-similar antenna or an equivalent antenna.

According to Aspect 4, the antenna element operates as, for example, a tapered slot antenna in a relatively high frequency band and, for example, a loop antenna in a relatively low frequency band. In a specific frequency band in an intermediate frequency band between a relatively high frequency band and a relatively low frequency band, the antenna element operates as a dipole antenna. In each band between the relatively high frequency band, the relatively low frequency band, and the intermediate frequency band, the antenna element 200 operates with the operating principles of these antennas combined, that is, a combined antenna. Accordingly, the antenna element 200 can operate stably over a wide frequency band even though it is one antenna element.

(Aspect 5)

Aspect 5 is the vehicular antenna device according to any one of Aspects 1 to 4, in which each of the first element section, the second element section, the third element section, and the fourth element section has an opening, the first element section and the second element section are arranged such that the opening of the first element section and the opening of the second element section face opposite each other, and the third element section and the fourth element section are arranged such that the opening of the third element section and the opening of the fourth element section face opposite each other.

According to Aspect 5, when each of the first element section, the second element section, the third element section and the fourth element section has a portion operating as a self-similar antenna or an equivalent antenna, the antenna element can operate stably over a wide frequency band.

(Aspect 6)

Aspect 6 is the vehicular antenna device according to any one of Aspects 1 to 5, in which each of the first element section, the second element section, the third element section, and the fourth element section is formed in any of a substantially C-shape, a substantially U-shape, a substantially V-shape, and a substantially n-shape.

According to Aspect 6, since the shape of each of the first element section, the second element section, the third element section and the fourth element section corresponds to a shape operating as a self-similar antenna or an equivalent antenna, the antenna element can operate stably over a wide frequency band.

(Aspect 7)

Aspect 7 is the vehicular antenna device according to any one of Aspects 1 to 6, further including:

an insulator provided in at least one place between the first element and the second element.

According to Aspect 7, the contact between the facing parts of the first element and the second element can be suppressed by the insulator. The insulator also serves as a spacer for adjusting the width of the region (gap) between the facing parts of the first element and the second element.

(Aspect 8)

Aspect 8 is the vehicular antenna device according to any one of Aspects 1 to 7, including:

a mounting surface on which the antenna element is mounted, in which at least one of the first element section and the second element section is tilted from a direction parallel to the mounting surface toward a side on which the mounting surface is located or a side opposite to the side on which the mounting surface is located.

According to Aspect 8, one of the first element section and the second element section can be arranged at an angle with respect to the other of the first element section and the second element section.

(Aspect 9)

Aspect 9 is the vehicular antenna device according to Aspect 8, in which the first element section and the second element section are tilted at substantially the same angle from the direction parallel to the mounting surface toward the side on which the mounting surface is located or the side opposite to the side on which the mounting surface is located.

According to Aspect 9, the radiation directivity of the antenna element in the zenith direction can be strengthened, as compared with the case where the angle of inclination of the first element section with respect to the direction parallel to the mounting surface and the angle of inclination of the second element section with respect to the direction parallel to the mounting surface are different.

(Aspect 10)

Aspect 10 is the vehicular antenna device according to Aspect 8, in which the first element section and the second element section are tilted at different angles from the direction parallel to the mounting surface toward the side on which the mounting surface is located or the side opposite to the side on which the mounting surface is located.

According to Aspect 10, the radiation directivity of the antenna element can be tilted from the zenith direction toward a desired direction, by adjusting the angle of inclination of each of the first element section and the second element section with respect to the direction parallel to the mounting surface.

(Aspect 11)

Aspect 11 is the vehicular antenna device according to Aspect 9 or 10, in which the first element section and the second element section are tilted at an angle of more than 0 degrees and 70 degrees or less with respect to the direction parallel to the mounting surface.

According to Aspect 11, the decrease from the characteristics (for example, gain or axial ratio) of the antenna element with the first element section and the second element section disposed parallel to each other can be suppressed within a sufficiently acceptable range, and the length of the first element in the facing direction of the first element section and the second element section can be shortened.

(Aspect 12)

Aspect 12 is the vehicular antenna device according to any one of Aspects 1 to 11, in which the antenna element is disposed on a ground plate.

According to Aspect 12, the antenna element can operate better as a GNSS antenna as compared to the case where the antenna element is not disposed on the ground plate.

(Aspect 13)

Aspect 13 is the vehicular antenna device according to any one of Aspects 1 to 12, further including:

a hybrid circuit imparting a 90 degrees phase difference to a signal sent to the first element and a signal sent to the second element.

According to Aspect 13, the hybrid circuit allows the antenna element to receive circular polarization.

(Aspect 14)

Aspect 14 is the vehicular antenna device according to Aspect 13, further including:

a circuit portion in a subsequent stage of the hybrid circuit with respect to the antenna element, in which the circuit portion has an amplifier and a bandpass filter.

According to Aspect 14, the circuit portion can function as an LNA.

This application claims priority based on Japanese Patent Application No. 2020-011871, filed Jan. 28, 2020, the entire disclosures of which is incorporated herein.

REFERENCE SIGNS LIST

10: vehicular antenna device
100: base
110: first base member
120: second base member
122: mounting surface
200: antenna element
210: first element
210*a*: first element section
210*b*: second element section
212*a*: first arm
212*b*: second arm
212*c*: third arm
212*d*: fourth arm
214*a*: first portion
214*b*: second portion
214*c*: third portion
214*d*: fourth portion
220: second element
220*a*: third element section
220*b*: fourth element section
222*a*: fifth arm
222*b*: sixth arm
222*c*: seventh arm
222*d*: eighth arm
224*a*: fifth portion
224*b*: sixth portion
224*c*: seventh portion
224*d*: eighth portion
230: insulator
300: circuit portion
310: amplifier
312: first-stage amplifier
314: second-stage amplifier
314*a*: first second-stage amplifier

314*b*: second second-stage amplifier
320: BPF
322: first BPF
324: second BPF
330: attenuator
330*a*: first attenuator
330*b*: second attenuator
410: first feed line
420: second feed line
430: hybrid circuit
500: cover
510: cable
510*a*: first cable
510*b*: second cable
600: ground plate
910: first stacked patch antenna
912: first patch antenna
914: second patch antenna
920: second stacked patch antenna
922: third patch antenna
924: fourth patch antenna
X: first direction
Y: second direction
Z: third direction

The invention claimed is:

1. A vehicular antenna device comprising:

an antenna element operable in at least two or more of frequency bands including L1 band, L band, L5 band, L2 band, and L6 band and receiving circular polarization, wherein the antenna element includes a first element having a first feed portion, and a first element section and a second element section arranged at opposite sides of the first feed portion, and a second element having a second feed portion, and a third element section and a fourth element section arranged at opposite sides of the second feed portion, at least a part of the first element and at least a part of the second element face each other, and one of the first element section and the second element section is arranged at an angle with respect to the other of the first element section and the second element section, wherein the first element section has a first portion and a second portion, the second element section has a third portion and a fourth portion, the third element section has a fifth portion and a sixth portion, the fourth element section has a seventh portion and an eighth portion, the first portion of the first element section and the fifth portion of the third element section face each other, the second portion of the first element section and the seventh portion of the fourth element section face each other, the third portion of the second element section and the sixth portion of the third element section face each other, and the fourth portion of the second element section and the eighth portion of the fourth element section face each other.

2. The vehicular antenna device according to claim 1, wherein the first element and the second element have substantially the same shape, and the fifth portion, the sixth portion, the seventh portion, and the eighth portion are turned by about 90 degrees with respect to the third portion, the fourth portion, the first portion, and the second portion, respectively.

3. The vehicular antenna device according to claim 1, wherein the first element section and the second element section of the first element, and the third element section and the fourth element section of the second element each have a portion operating as a self-similar antenna or an equivalent antenna.

4. The vehicular antenna device according to claim 1, wherein each of the first element section, the second element section, the third element section, and the fourth element section has an opening, the first element section and the second element section are arranged such that the opening of the first element section and the opening of the second element section face opposite each other, and the third element section and the fourth element section are arranged such that the opening of the third element section and the opening of the fourth element section face opposite each other.

5. The vehicular antenna device according to claim 1, wherein each of the first element section, the second element section, the third element section, and the fourth element section is formed in any of a substantially C-shape, a substantially U-shape, a substantially V-shape, and a substantially n-shape.

6. The vehicular antenna device according to claim 1, further comprising:

an insulator provided in at least one place between the first element and the second element.

7. The vehicular antenna device according to claim 1, further comprising:

a mounting surface on which the antenna element is mounted, wherein at least one of the first element section and the second element section is tilted from a direction parallel to the mounting surface toward a side on which the mounting surface is located or a side opposite to the side on which the mounting surface is located.

8. The vehicular antenna device according to claim 7, wherein the first element section and the second element section are tilted at substantially the same angle from the direction parallel to the mounting surface toward the side on which the mounting surface is located or the side opposite to the side on which the mounting surface is located.

9. A vehicular antenna device comprising:

an antenna element operable in at least two or more of frequency bands including L1 band, L band, L5 band, L2 band, and L6 band and receiving circular polarization, wherein the antenna element includes a first element having a first feed portion, and a first element section and a second element section arranged at opposite sides of the first feed portion, and a second element having a second feed portion, and a third element section and a fourth element section arranged at opposite sides of the second feed portion, at least a part of the first element and at least a part of the second element face each other, one of the first element section and the second element section is arranged at an angle with respect to the other of the first element section and the second element section; and a mounting surface on which the antenna element is mounted, wherein at least one of the first element section and the second element section is tilted from a direction parallel to the mounting surface toward a side on which the mounting surface is located or a side opposite to the side on which the mounting surface is located, and the first element section and the second element section are tilted at different angles from the direction parallel to the mounting surface toward the side on which the mounting surface is located or the side opposite to the side on which the mounting surface is located.

10. The vehicular antenna device according to claim 8, wherein the first element section and the second element section are tilted at an angle of more than 0 degrees and 70 degrees or less with respect to the direction parallel to the mounting surface.

11. The vehicular antenna device according to claim 1, wherein the antenna element is disposed on a ground plate.

12. The vehicular antenna device according to claim 1, further comprising:

a hybrid circuit imparting a 90 degrees phase difference to a signal sent to the first element and a signal sent to the second element.

13. The vehicular antenna device according to claim 12, further comprising:

a circuit portion in a subsequent stage of the hybrid circuit with respect to the antenna element, wherein the circuit portion has an amplifier and a bandpass filter.

* * * * *